US011644234B2

(12) United States Patent
Holt et al.

(10) Patent No.: US 11,644,234 B2
(45) Date of Patent: *May 9, 2023

(54) SYSTEMS AND METHODS FOR USING MULTIPLE CRYOGENIC HYDRAULIC TURBINES

(71) Applicant: ExxonMobil Upstream Research Company, Spring, TX (US)

(72) Inventors: Christopher G. Holt, Montgomery, TX (US); Todd S. Griffith, Flower Mound, TX (US)

(73) Assignee: ExxonMobil Technology and Enginering Company, Spring, TX (US)

(*) Notice: Subject to any disclaimer, the term of this patent is extended or adjusted under 35 U.S.C. 154(b) by 442 days.

This patent is subject to a terminal disclaimer.

(21) Appl. No.: 16/842,246

(22) Filed: Apr. 7, 2020

(65) Prior Publication Data
US 2020/0232704 A1 Jul. 23, 2020

Related U.S. Application Data

(62) Division of application No. 15/266,634, filed on Sep. 15, 2016, now Pat. No. 10,648,729, which is a
(Continued)

(51) Int. Cl.
*F25J 1/00* (2006.01)
*F01D 15/10* (2006.01)
(Continued)

(52) U.S. Cl.
CPC ............ *F25J 1/0042* (2013.01); *F01D 15/10* (2013.01); *F03B 13/00* (2013.01); *F25J 1/004* (2013.01);
(Continued)

(58) Field of Classification Search
CPC .. F25J 1/0022; F25J 1/004; F25J 1/005; F25J 1/0052; F25J 1/0055; F25J 2210/06;
(Continued)

(56) References Cited

U.S. PATENT DOCUMENTS 2,922,285 A * 1/1960 Rae .................. F25J 1/0236
205/338
3,677,019 A 7/1972 Olszewski
(Continued)

FOREIGN PATENT DOCUMENTS

CN 103148673 A * 6/2013 ............. F25J 1/0022
EP 0672877 1/1995
(Continued)

*Primary Examiner* — Miguel A Diaz
(74) *Attorney, Agent, or Firm* — ExxonMobil Technology and Engineering Company—Law Department

(57) ABSTRACT

There is provided a system and method for producing liquefied natural gas (LNG). An exemplary method includes flowing a high-pressure stream of LNG through a first series of liquid turbines. The exemplary method also includes generating electricity by reducing the pressure of the high-pressure stream of LNG to form a low-pressure stream of LNG. The exemplary method additionally includes bypassing any one the liquid turbines that has a failure while continuing to produce electricity from the first series.

17 Claims, 17 Drawing Sheets

700

Related U.S. Application Data division of application No. 13/810,624, filed as application No. PCT/US2011/041851 on Jun. 24, 2011, now abandoned.

(60) Provisional application No. 61/369,481, filed on Jul. 30, 2010.

(51) Int. Cl.
*F25J 1/02* (2006.01)
*F03B 13/00* (2006.01)
*H02K 7/18* (2006.01)

(52) U.S. Cl.
CPC ............ *F25J 1/005* (2013.01); *F25J 1/0022* (2013.01); *F25J 1/0052* (2013.01); *F25J 1/0205* (2013.01); *F25J 1/025* (2013.01); *F25J 1/0228* (2013.01); *F25J 1/0244* (2013.01); *F25J 1/0247* (2013.01); *F25J 1/0248* (2013.01); *F25J 1/0257* (2013.01); *F25J 1/0271* (2013.01); *H02K 7/1823* (2013.01); *F05B 2210/11* (2013.01); *F05B 2210/14* (2013.01); *F25J 2210/06* (2013.01); *F25J 2220/62* (2013.01); *F25J 2220/64* (2013.01); *F25J 2220/66* (2013.01); *F25J 2220/68* (2013.01); *F25J 2240/04* (2013.01); *F25J 2240/30* (2013.01); *F25J 2240/40* (2013.01); *F25J 2270/90* (2013.01); *Y02E 10/20* (2013.01)

(58) Field of Classification Search
CPC .. F25J 2240/40; F25J 2240/90; F25J 2220/64; F25J 2220/66; F25J 2220/68; F25J 3/0214; F25J 3/0615; F25J 3/04133
See application file for complete search history.

(56) References Cited

U.S. PATENT DOCUMENTS

| | | | |
|---|---|---|---|
| 3,724,226 A | 4/1973 | Pachaly | |
| 3,911,285 A | 10/1975 | Yannone et al. | |
| 3,954,430 A * | 5/1976 | Curtis | C01C 1/00 62/619 |
| 4,019,343 A * | 4/1977 | Roberts | F25B 1/10 62/510 |
| 4,187,899 A * | 2/1980 | Sterlini | F25B 1/10 62/79 |
| 4,334,902 A | 6/1982 | Paradowski | |
| 4,593,202 A | 6/1986 | Dickinson | |
| 4,638,638 A | 1/1987 | Marshall et al. | |
| 4,758,257 A | 7/1988 | Gates et al. | |
| 5,537,827 A | 7/1996 | Low et al. | |
| 5,651,269 A | 7/1997 | Prevost et al. | |
| 5,659,205 A | 8/1997 | Weisser | |
| 5,689,141 A | 11/1997 | Kikkawa et al. | |
| 5,950,453 A | 9/1999 | Bowen et al. | |
| 6,105,389 A | 8/2000 | Paradowski et al. | |
| 6,158,240 A | 12/2000 | Low et al. | |
| 6,647,744 B2 * | 11/2003 | Fanning | F25J 1/0216 62/612 |
| 6,898,949 B2 * | 5/2005 | Paradowski | F25J 1/0219 62/621 |
| 7,047,764 B2 | 5/2006 | Sawchuk et al. | |
| 7,234,321 B2 | 6/2007 | Maunder et al. | |
| 7,234,322 B2 | 6/2007 | Hahn et al. | |
| 7,353,653 B2 | 4/2008 | Bronicki | |
| 7,415,840 B2 | 8/2008 | Eaton et al. | |
| 7,637,122 B2 | 12/2009 | Turner et al. | |
| 2003/0005698 A1 * | 1/2003 | Keller | F01K 23/10 60/643 |
| 2003/0233830 A1 * | 12/2003 | Marin | F01K 21/042 60/649 |
| 2005/0146221 A1 | 7/2005 | Pettigrew | |
| 2005/0231350 A1 | 10/2005 | Littrell et al. | |
| 2006/0283206 A1 | 12/2006 | Rasmussen et al. | |
| 2008/0238101 A1 * | 10/2008 | Ziegenfuss | F01D 15/10 290/52 |
| 2009/0217701 A1 * | 9/2009 | Minta | F25J 1/0288 62/612 |
| 2009/0229275 A1 | 9/2009 | Madison | |
| 2010/0300144 A1 | 12/2010 | Madison | |

FOREIGN PATENT DOCUMENTS

| | | |
|---|---|---|
| JP | 07-004205 | 1/1995 |
| JP | 2003-97224 | 4/2003 |
| WO | WO-2022064533 A1 * | 3/2022 |

* cited by examiner

300

400

500

600

700

800

1000

1500

SYSTEMS AND METHODS FOR USING MULTIPLE CRYOGENIC HYDRAULIC TURBINES

CROSS-REFERENCE TO RELATED APPLICATIONS

This application is a divisional of U.S. patent application Ser. No. 15/266,634 filed Sep. 15, 2016, which is a divisional of the National Stage entry under 35 U.S.C. 371 of International Application No. PCT/US2011/041851 that published as WO2012/015546 and was filed on 24 Jun. 2011, which claims the benefit of and priority from U.S. Provisional Application No. 61/369,481, filed on 30 Jul. 2010, each of which is incorporated herein by reference, in its entirety, for all purposes.

FIELD

Exemplary embodiments of the present techniques relate to using multiple cryogenic hydraulic turbines in series or series-parallel fashion, such as to cool natural gas in a liquefied natural gas (LNG) plant.

BACKGROUND

Large volumes of natural gas (i.e., primarily methane) are located in remote areas of the world. This gas has significant value if it can be economically transported to market. Where the gas reserves are located in reasonable proximity to a market and the terrain between the two locations permits, the gas is typically produced and then transported to market through submerged and/or land-based pipelines. However, when gas is produced in locations where laying a pipeline is infeasible or economically prohibitive, other techniques must be used for getting this gas to market.

A commonly used technique for non-pipeline transport of gas involves liquefying the gas at or near the production site and then transporting the liquefied natural gas to market in specially designed storage tanks aboard transport vessels. The natural gas is cooled and condensed to a liquid state to produce liquefied natural gas ("LNG"). LNG is typically, but not always, transported at substantially atmospheric pressure and at temperatures of about −162° C. (−260° F.), thereby significantly increasing the amount of gas which can be stored in a particular storage tank on a transport vessel. For example, LNG takes about 1/600 of the volume of natural gas in the gas phase.

Once an LNG transport vessel reaches its destination, the LNG is typically off-loaded into other storage tanks from which the LNG can then be revaporized as needed and transported as a gas to end users through pipelines or the like. LNG has been an increasingly popular transportation method to supply major energy-consuming nations with natural gas.

The liquefaction process may have a number of stages during which the natural gas is cooled and liquefied. During the cooling process, the pressure is lowered, with the shipping pressure of the liquefied product being near atmospheric (for example, about 3.6 psig or less). The decrease in pressure assists in cooling the natural gas during the liquefaction process by decreasing the enthalpy of the natural gas. Refrigeration equipment is also used for removing heat energy.

One stage of this process requires that the high-pressure liquid phase of the natural gas stream be reduced in pressure sufficiently to assist in the production of extremely cold LNG (or subcooled LNG) by extracting energy (or enthalpy) from a liquid natural gas stream. This may be accomplished through hydraulic turbine pressure drop.

Hydraulic turbine pressure drop can often be used in LNG processes to remove energy from liquid refrigerant streams and liquid natural gas streams to obtain lower temperatures. The energy removed from these liquid streams may also be used to generate electrical power. For example, turbines can be coupled with a generator to provide the braking load necessary to remove the energy. The generator may be coupled to the facility power grid, wherein the additional power improves the thermodynamic efficiency of the process. In LNG processes, the efficiency improvement may be about 1 to 2%, resulting in saving many Megawatt-hours per year and improving economic justification of the liquefaction process.

Other parties have proposed the concept of applying turbines in series to satisfy the need for high pressure let down at a magnitude greater than typically performed in existing facilities. Examples of series expansion are considered in patents related to air separation, as well as in cascade LNG liquefaction processes, among others.

U.S. Pat. No. 3,724,226 to Pachaly discloses an LNG expander cycle process employing integrated cryogenic purification. In the process, a work-expanded refrigerant portion undergoes a compression cycle and is work expanded through a series of expansion turbines. The expansion turbines furnish at least part of the power necessary to drive the compressor system in the refrigerant gas cycle, by sharing a common shaft or other mechanical coupling with the compressors. The expanders used are turbo-expanders, which can liquefy a portion of a high-pressure gas stream as it is depressurized through the turbo expanders. The expanded stream can then be flowed through cooling units to remove more energy, prior to flowing through more turbo-expanders.

U.S. Pat. No. 4,019,343 to Roberts discloses a refrigeration system using enthalpy converting liquid turbines. The refrigeration system uses a series of liquid turbines, each of which have an associated compressor. A stream of liquid ammonia is allowed to expand in a liquid turbine, during which a portion of the liquid flashes and is sent to the associated compressor. The cooled, expanded liquid flows to the next turbine in the series, where the process is repeated.

Related information may be found in U.S. Pat. Nos. 2,922,285; 3,677,019; 4,638,638; 4,758,257; 5,651,269; 6,105,389; 6,647,744; 6,898,949; and 7,047,764. Further information may also be found in U.S. Patent Application Publication Nos. 2003/0005698 and 2005/0183452. Additional information may be found in International Patent Application Publication No. WO 2007/021351 and European Patent Application Publication No. 0 672 877 A1.

Due to the increase in demand seen in recent years, increased emphasis has been placed on cost and schedule efficiency of new gas liquefaction projects in order to reduce the cost of the delivered gas. Large natural gas liquefaction projects expose the developers to substantial commercial risk due to the large initial capital costs of these projects (which may for example be $5 billion or higher). Improvements in cost, design, and schedule efficiency can help mitigate the substantial commercial risk associated with large LNG development projects.

SUMMARY

An exemplary embodiment of the present techniques provides a method for generating electricity from liquid turbines. The method includes flowing a high-pressure liquid stream through a first series of liquid turbines, in which, after a first turbine in the series, an inlet of each liquid turbine is coupled to an outlet of a proceeding liquid turbine. Electricity is generated from the first series by removing energy from the high-pressure liquid stream to form a low-pressure liquid stream. Any one of the liquid turbines that has a failure can be bypassed, while continuing to produce electricity with the remaining turbines of the first series.

The method may also include maintaining the total electrical output as a constant value when a liquid turbine is bypassed. Further, the method may include maintaining the pressure, temperature, and flow rate of the low-pressure liquid stream when a liquid turbine is bypassed.

In embodiments, a portion of the high-pressure liquid stream may be removed prior to the first series and flowed through a second series of liquid turbines. In the second series, after a first turbine, an inlet of each liquid turbine is coupled to an outlet of a proceeding liquid turbine. The second series may be in parallel with the first series. Electricity is generated from the second series by removing energy from the portion of the high-pressure liquid stream to form a low-pressure liquid stream.

The high-pressure liquid stream comprises a liquefied natural gas, and LNG may be produced in the method. The method may also include driving a variable frequency drive from the electric generator, and if the variable frequency drive fails, adjusting a speed of a turbine coupled to the generator to synchronize a generator frequency with a grid frequency, and directly coupling an output of the generator to the electrical grid.

Another exemplary embodiment of the present techniques provides a method for producing liquefied natural gas (LNG). The method includes flowing a high-pressure stream of LNG through a first series of liquid turbines and generating electricity by reducing the pressure of the high-pressure stream of LNG to form a low-pressure stream of LNG. Any one of the liquid turbines that has a failure may be bypassed while continuing to produce electricity from the first series.

The method may also include flowing a portion of the high-pressure stream of LNG through a second series of liquid turbines, which is in parallel with the first series. Electricity may also be generated in the second series of liquid turbines by removing energy from the portion of the high-pressure stream of LNG while reducing the pressure to form a low-pressure stream of LNG.

Another exemplary embodiment provides a liquefied natural gas (LNG) plant. The LNG plant may include a first series of liquid turbine expanders, in which, after a first liquid turbine expander, the inlet of each liquid turbine expander is coupled to a previous liquid turbine expander. Each of the series of liquid turbine expanders may include an electric generator configured to produce electricity with energy created by lowering a pressure of a liquid. Each of the liquid turbine expanders may be configured to be bypassed while allowing the LNG plant to continue operating.

The LNG plant may also include a second series of liquid turbine expanders, in which, after a first liquid turbine expander, the inlet of each liquid turbine expander in the second series is coupled to a previous liquid turbine expander. Each of the second series of liquid turbine expanders may also include an electric generator configured to produce electricity with energy removed from a liquid as the pressure is decreased. The first series of turbines may be in parallel with the second series. Each one of the second series of liquid turbine expanders may be configured to be bypassed, while allowing the LNG plant to continue operating.

The liquid may be LNG, a refrigerant, or both. The LNG plant may include an automated control system configured to bypass a liquid turbine expander based, at least in part, on a sensor reading from the liquid turbine expander. In an embodiment, the sensor reading may be a high level on a vibration sensor. The sensor reading may include a detection of a failure on a variable frequency drive coupled to an electric generator.

The LNG plant may include a variable frequency drive coupled to each electric generator and an automated control system configured to bypass the variable frequency drive and directly couple the generator to an electrical grid. In the LNG plant, at least one of the turbines may have a spare turbine coupled in parallel, wherein the spare turbine may be configured to be brought on-line in place of the turbines. The internal components of each of the turbines may be of identical design.

In an embodiment that uses two parallel series of turbines, a coupling may exist between the first series and the second series. The coupling may be located after a first turbine in each series and before a last turbine in each series and may be configured to allow flow of liquid between the first series and the second series. The LNG plant may include a single variable frequency drive coupled to all of the electric generators. At least one electrical generator may be directly coupled to an electric grid and the series of turbines may have a variable frequency drive on a first turbine, a last turbine, or both. The electric generators for all of the turbines may be directly connected to an electric grid.

DESCRIPTION OF THE DRAWINGS

The advantages of the present techniques are better understood by referring to the following detailed description and the attached drawings, in which.

DETAILED DESCRIPTION

Figure 1:
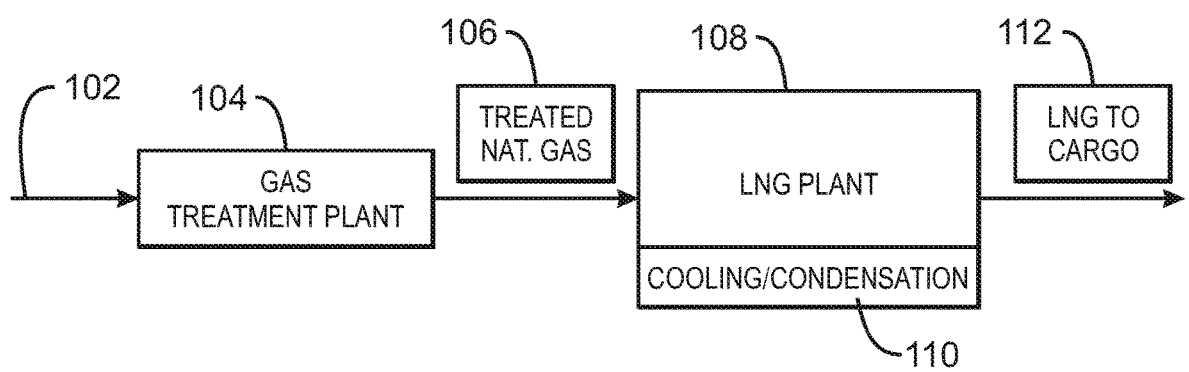
FIG. 1 is a block diagram of a liquefied natural gas (LNG) plant.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the true spirit and scope of the appended claims.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

As used herein, a "compressor" includes any type of equipment designed to increase the pressure of a material, and includes any one type or combination of similar or different types of compression equipment. A compressor may also include auxiliary equipment associated with the compressor, such as motors, and drive systems, among others. The compressor may utilize one or more compression stages, for example, in series. Illustrative compressors may include, but are not limited to, positive displacement types, such as reciprocating and rotary compressors for example, and dynamic types, such as centrifugal and axial flow compressors, for example.

"Cryogenic temperature" refers to a temperature that is about −50° C. or below.

"Expansion device" refers to one or more devices suitable for reducing the pressure of a fluid in a line (for example, a liquid stream, a vapor stream, or a multiphase stream containing both liquid and vapor). Unless a particular type of expansion device is specifically stated, the expansion may be performed at least partially by isenthalpic means, may be performed at least partially by isentropic means, or may be performed by a combination of both isentropic means and isenthalpic means. Suitable devices for isenthalpic expansion of natural gas are known in the art and generally include, but are not limited to, manually or automatically actuated throttling devices such as, for example, valves, control valves, Joule-Thomson (J-T) valves, or venturi devices. Suitable devices for isentropic expansion of natural gas are known in the art. Generally, they include equipment such as expanders or turbo expanders that extract or derive work from such expansion. Suitable devices for isentropic expansion of liquid streams are known in the art. Generally, they include equipment such as expanders, hydraulic expanders, liquid turbines, or turbo expanders that extract or derive work from such expansion. An example of a combination of both isentropic means and isenthalpic means may be a Joule-Thomson valve and a turbo expander in parallel, which provides the capability of using either alone or using both the J-T valve and the turbo expander simultaneously. Isenthalpic or isentropic expansion can be conducted in the all-liquid phase, all-vapor phase, or mixed phases, and can be conducted to facilitate a phase change from a vapor stream or liquid stream to a multiphase stream (a stream having both vapor and liquid phases). In the description of the drawings herein, the reference to more than one expansion device in any drawing does not necessarily mean that each expansion device is the same type or size.

"Expansion-type cooling" refers to cooling which occurs when the pressure of a gas, liquid, or two-phase system is decreased by passage through a pressure reduction means. In one embodiment, the expansion means is a Joule-Thompson expansion valve. In another embodiment of the present invention, the expansion means is a hydraulic or gas expander, such as a turbo-expander.

As used herein, a "heat exchange unit" includes any one type or combination of similar or different types of equipment known in the art for facilitating heat transfer. Thus, a heat exchange unit may be a single piece of equipment, or it may comprise equipment contained in a plurality of equipment pieces. Conversely, multiple heat exchange units may be contained in a single piece of equipment, for example, a cooling box containing multiple heat exchangers.

The term "gas" is used interchangeably with "vapor," and is defined as a substance or mixture of substances in the gaseous state as distinguished from the liquid or solid state. Likewise, the term "liquid" means a substance or mixture of substances in the liquid state as distinguished from the gas or solid state.

A "hydrocarbon" is an organic compound that primarily includes the elements hydrogen and carbon, although nitrogen, sulfur, oxygen, metals, or any number of other elements may be present in small amounts. As used herein, hydrocarbons generally refer to components found in raw natural gas, such as $CH_4$, $C_2H_2$, $C_2H_4$, $C_2H_6$, $C_3$ isomers, $C_4$ isomers, benzene, and the like.

"Liquefied natural gas" or "LNG" is natural gas generally known to include a high percentage of methane, but also other elements and/or compounds. The other elements or compounds may include, but are not limited to, ethane, propane, butane, carbon dioxide, nitrogen, helium, hydrogen sulfide, or combinations thereof) that has been processed to remove one or more components (for instance, helium) or impurities (for instance, water and/or heavy hydrocarbons) and then condensed into a liquid at almost atmospheric pressure by cooling.

The term "natural gas" refers to a multi-component gas obtained from a crude oil well (associated gas) or from a subterranean gas-bearing formation (non-associated gas). The composition and pressure of natural gas can vary significantly. A typical natural gas stream contains methane ($C_1$) as a significant component. Raw natural gas may often contain ethane ($C_2$), higher molecular weight hydrocarbons, one or more acid gases (such as carbon dioxide, hydrogen sulfide, carbonyl sulfide, carbon disulfide, and mercaptans), and minor amounts of contaminants such as water, nitrogen, iron sulfide, wax, and crude oil.

"Pressure" is the force exerted per unit area by the gas on the walls of the volume. Pressure can be shown as pounds per square inch (psi). "Atmospheric pressure" refers to the local pressure of the air. "Absolute pressure" (psia) refers to the sum of the atmospheric pressure (14.7 psia at standard conditions) plus the gage pressure (psig). "Gauge pressure" (psig) refers to the pressure measured by a gauge, which indicates only the pressure exceeding the local atmospheric pressure (i.e., a gauge pressure of 0 psig corresponds to an absolute pressure of 14.7 psia). The term "vapor pressure" has the usual thermodynamic meaning. For a pure component in an enclosed system at a given pressure, the component vapor pressure is essentially equal to the total pressure in the system.

"Sour gas" generally refers to natural gas containing sour species such as hydrogen sulfide ($H_2S$) and carbon dioxide ($CO_2$). When the $H_2S$ and $CO_2$ have been removed from the natural gas feedstream, the gas is classified as "sweet." The term "sour gas" is applied to natural gases including $H_2S$ because of the odor that is emitted even at low concentrations from an unsweetened gas.

"Substantial" when used in reference to a quantity or amount of a material, or a specific characteristic thereof, refers to an amount that is sufficient to provide an effect that the material or characteristic was intended to provide. The exact degree of deviation allowable may depend, in some cases, on the specific context.

Overview

FIG. 1 is a block diagram of a liquefied natural gas (LNG) plant. As shown in FIG. 1, a raw gas feed 102 can be processed in a gas treatment plant 104. The gas treatment plant 104 may remove acid gases (such as $CO_2$ and $H_2S$), as well as water, heavier hydrocarbons (such as ethane, ethylene, $C_3$ isomers, and higher carbon compounds), and other impurities. The treated natural gas 106 is cooled and liquefied in a LNG Plant 108. A portion of the treated gas 106 may be combusted in gas turbines to power the LNG Plant 108, for example, driving refrigerant compressors in a cooling/condensation section 110 of the LNG plant 108. After the LNG 112 is produced, it is transferred to a cargo loading point, where it may be loaded into ships or other LNG transport vessels to be carried to an energy consuming location, as noted above. The cooling/condensation section 110 of the LNG plant 108 is discussed in detail in FIG. 2.

Figure 2:
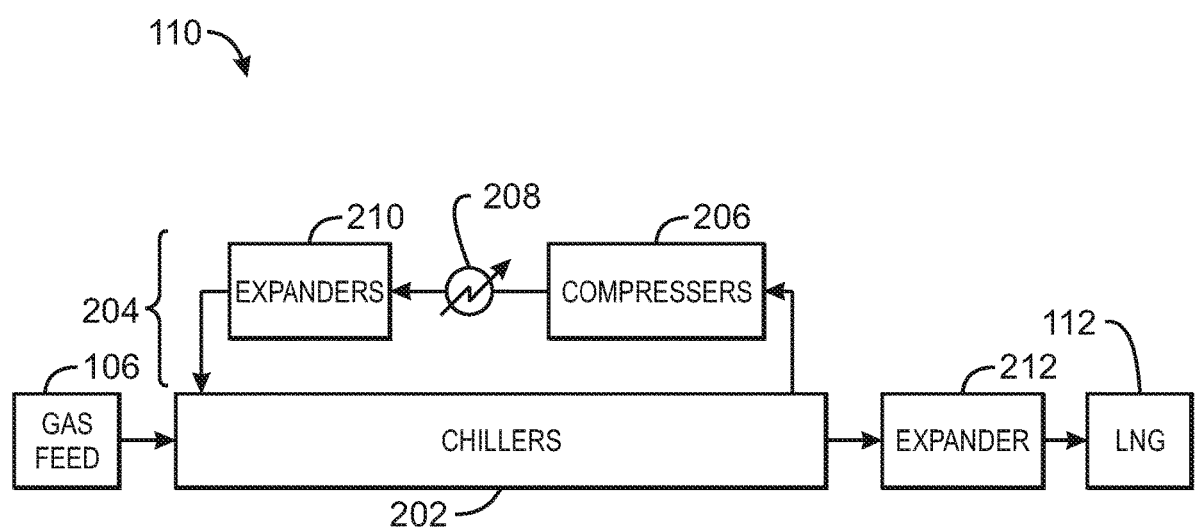
FIG. 2 is a block diagram of the cooling/condensation section of an LNG plant.

FIG. 2 is a block diagram of a cooling/condensation section 110 of an LNG plant 108 (FIG. 1). In the cooling/condensation section 110, the treated gas feed 106 may be passed through one or more chillers 202 to remove energy and condense the gas. The chillers 202 may be cooled by one or more refrigerant systems 204, which may include compressors 206, coolers 208, and expanders 210. The expanders 210 provide a pressure let down which can remove energy from the refrigerant. A pressure let down is described as reducing the pressure of the liquid stream from a higher pressure ($P_1$) to a lower pressure ($P_2$). This can be used to reduce the energy of the refrigerant prior to flowing the refrigerant through the chillers 202. In an exemplary embodiment, the refrigerant expanders 210 include cryogenic liquid turbines (also known as cryogenic hydraulic turbines, cryogenic liquid expanders, or cryogenic hydraulic expanders), which are coupled to electrical generators that provide a braking load. Thus, electrical power can be generated using energy removed from the fluid by the cryogenic liquid turbines. However, the capacity of cryogenic liquid turbines may be limited by total machine power, total differential pressure, and maximum flow volume liquid turbine expanders as described herein.

Once the LNG is liquefied, a LNG expander 212 may be used to provide a pressure let down to lower the pressure of the LNG stream and further reduce its energy. The LNG expander 212 may be of the same type as described for the refrigerant expander 210. In an exemplary embodiment of the present techniques, multiple cryogenic hydraulic turbines (hereinafter liquid turbines) are coupled in series or in series-parallel arrangements to achieve pressure let down in an LNG process. Any number of LNG plant technologies may use exemplary embodiments of the present techniques, such as the LNG plant configuration illustrated in FIG. 3.

Figure 3:
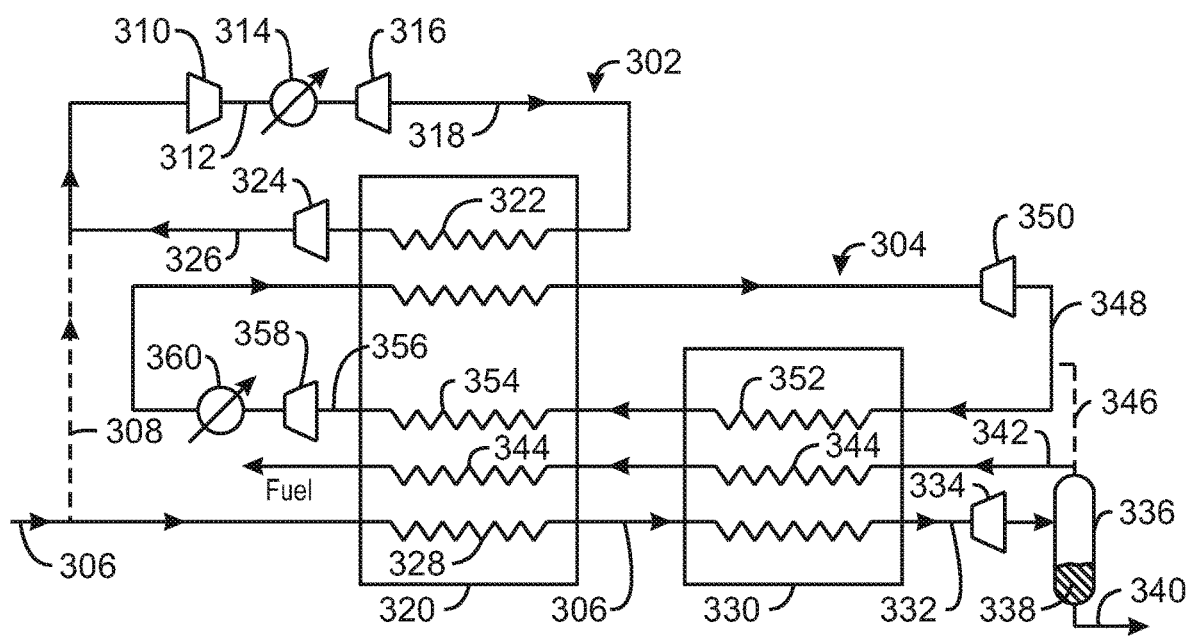
FIG. 3 illustrates a LNG plant in which an expander loop (i.e., an expander cycle) and a sub-cooling loop may use multiple liquid turbines to produce electricity while removing energy.

FIG. 3 illustrates a LNG plant 300 in which an expander loop 302 (i.e., an expander cycle) and a sub-cooling loop 304 may use multiple liquid turbines to produce electricity while removing energy from refrigerants and a feed gas stream 306. As used herein, the terms "loop" and "cycle" are used interchangeably. In FIG. 3, the feed gas stream 306 enters the liquefaction process at a pressure less than about 1200 psia. The feed gas stream 306 may be at lower pressures, for example, less than about 600 psia. Typically, the pressure of feed gas stream 306 can be about 800 psia. Feed gas stream 306 may include natural gas that has been treated to remove contaminants, such as treated natural gas stream 106 (FIG. 1).

A portion of the feed gas stream 306 may be withdrawn to form a side stream 308, to provide a refrigerant for expander loop 302, as shown in FIG. 3. However, if natural gas is used as a refrigerant in the expander loop 302, it may be withdrawn from any number of other locations in the process, including after the feed gas has been passed to a heat exchange area. The side stream 308 can be passed to a compressor 310 where it may be compressed to a pressure greater than about 1500 psia, providing a compressed refrigerant stream 312. The pressure is not limited to 1500 psia, as any pressure may be used. For example, the compressed refrigerant stream 312 may be at a pressure greater than about 2500 psia, or even greater.

After exiting the compressor 310, the compressed refrigerant stream 312 may flow through a cooler 314 where it can be cooled by indirect heat exchange with a suitable cooling fluid to provide a compressed, cooled refrigerant stream. The cooler 314 may use water or air as the cooling fluid, although any type of cooling fluid can be used. The temperature of the compressed refrigerant stream 312 as it emerges from cooler 314 depends on the ambient conditions and the cooling medium used and may be about 35° F. to about 105° F. The cooled compressed refrigerant stream 312 can then pass to an expander 316 where it can be expanded and cooled to form an expanded refrigerant stream 318. In exemplary embodiments of the present techniques, the expander 316 includes multiple liquid turbines, in a series or a series-parallel arrangement, to generate electricity, as discussed in further detail below.

The expanded refrigerant stream 318 may flow to a first heat exchange unit 320 to provide at least part of the refrigeration duty for the first heat exchange unit 320. In the first heat exchange unit 320, the expanded refrigerant stream 318 may be passed through a heat exchanger 322. In some embodiments, the expanded refrigerant stream 318 may be flashed in the heat exchanger 322 to provide greater cooling.

Upon exiting the first heat exchange unit 320, the expanded refrigerant stream 318 can be fed to a compressor 324. In the compressor 324, the expanded refrigerant stream 318 is compressed to form a compressed stream 326, which can then be joined with side stream 308. Once expander loop 302 has been filled with the feed gas 306 from the side stream 308, only a small make-up amount of feed gas 306 may be used to replace losses from leaks. Thus, the majority of the gas entering the compressor 310 will generally be provided by the compressed stream 326. The portion of the feed gas stream 306 that is not withdrawn as side stream 308 is passed to the heat exchange unit 320 where it may be cooled, at least in part, by indirect heat exchange with expanded refrigerant stream 318, for example, by flowing through a heat exchanger 328.

After exiting the first heat exchange unit 320, the feed gas stream 306 can pass through a second heat exchange unit 330. The second heat exchange unit 330 can be used to sub-cool the feed gas stream 306, for example, by indirect heat exchange with the sub-cooling loop 304, to produce a sub-cooled stream 332. The sub-cooled stream 332 may be expanded to a lower pressure in a second expander 334, thereby partially liquefying sub-cooled stream 332 to form a liquid fraction and a remaining vapor fraction. In an exemplary embodiment of the present techniques, the second expander 334 includes multiple liquid turbines, in a series or series-parallel arrangement, to generate electricity, as discussed in further detail below.

The cooled sub-cooled stream 332 can be passed to surge tank 336 where a liquefied fraction 338 is withdrawn from the process as a LNG stream 340 having a temperature corresponding to the bubble point pressure. The remaining vapor fraction may include both natural gas and any nitrogen remaining in the sub-cooled stream 332. The vapor fraction stream 342 may be used as fuel to power the compressors, for example, being combusted in gas turbine engines to drive compressor strings. Prior to being used as fuel, all or a portion of the flash vapor stream 342 may be passed from the surge tank 336 through heat exchangers 344 in the heat exchange units 330 and 320 to supplement the cooling provided by the refrigerants.

A portion of the flash vapor 342 may be withdrawn through a line 346 to act as a refrigerant in sub-cooling loop 304. Once sub-cooling loop 304 is fully charged with gas, only make-up gas (i.e., additional flash vapor from line 346) may be added to replace losses from leaks. In sub-cooling loop 304, an expanded stream 348 can be discharged from a third expander 350 and passed through a heat exchanger 352 in the second heat exchange unit 330 and a second heat exchanger 354 in the first heat exchange unit 320. As the expanded stream 348 passes through the heat exchange units 330 and 320, it can be flashed into a vapor stream 356. The vapor stream 356 can be fed to a compressor 358, in which it is re-compressed to a higher pressure. After exiting the compressor 358, the re-compressed sub-cooling refrigerant stream can be passed through a second cooler 360 to remove heat from the compression. The second cooler 360 may be of the same type as cooler 314, although any type of cooler may be used. After cooling, the re-compressed sub-cooling refrigerant stream is passed to the first heat exchange unit 320, where it may be further cooled by indirect heat exchange with expanded refrigerant stream 318, sub-cooling refrigerant stream 348, and flash vapor stream 342. After exiting the first heat exchange unit 320, the re-compressed and cooled sub-cooling refrigerant stream can be expanded through an expander 350 to provide the expanded stream 348, which may then be used to repeat the cycle.

The techniques described herein are not limited to the configuration shown in the exemplary embodiment illustrated in FIG. 3, as any number of processes may use liquid turbine generators and may take advantage of the serial and serial-parallel arrangements described herein. Such processes may include the LNG production processes C3MR and APCI from AirProducts, the cascade LNG process from ConocoPhillips, the Shell DMR LNG process, and LNG production processes from Linde.

Liquid Turbine Configurations

Figure 4:
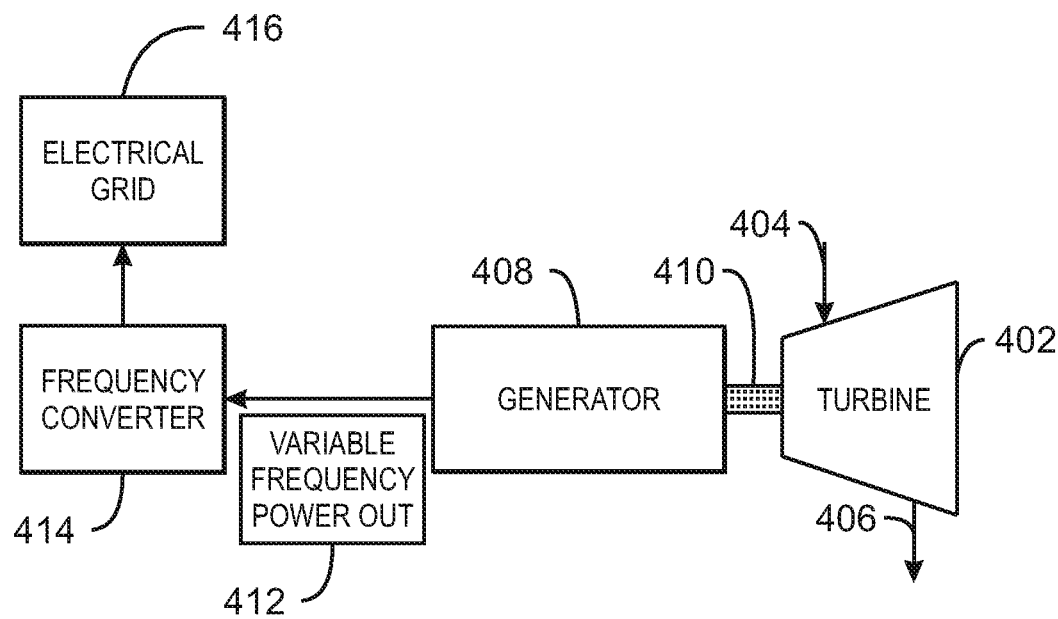
FIG. 4 is a schematic diagram of a liquid turbine generator.

FIG. 4 is a schematic diagram of a liquid turbine generator 400. The basic components of the liquid turbine generator 400 include a turbine 402 with process fluid inlet 404 and fluid outlet 406 connections. A variable frequency generator 408 can be connected to the turbine 402 through a connection shaft 410. The electrical power 412 produced can be sent to a frequency converter or variable frequency drive (VFD) 414, where the frequency can be adjusted to match grid frequencies (e.g., 50 or 60 Hz) before being provided to an electrical grid 416. The use of a VFD 414 allows the speed of the liquid turbine 402 to be adjusted to optimize power production. However, the generator 408 is not limited to operation with a VFD 414. In an exemplary embodiment, the liquid turbine 402 is operated in a fixed speed mode where the generator 408 is directly connected to the electrical power grid 416. This may be useful for maintaining operation in case of a failure of the VFD 414. Further, a fixed speed turbine design may be selected to lower the cost of the system. In this case, the liquid turbine 402 may be used with adjustable inlet guide vanes to improve turbine operation efficiency. The generator 408 may or may not be in a separate vessel from the liquid turbine 402.

Figure 5:
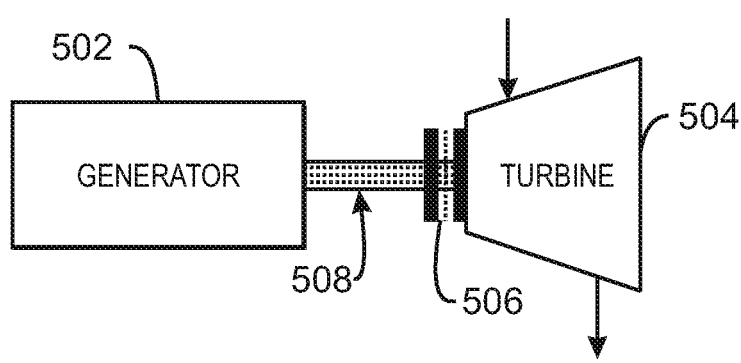
FIG. 5 is a schematic diagram of a generator that is separated from the liquid turbine.

FIG. 5 is a schematic diagram 500 of a generator 502 that is separated from the liquid turbine 504. As shown in the diagram 500, a process fluid sealing mechanism 506 may be located on the shaft 508 between the turbine 504 and the generator 502. In other embodiments, the turbine and generator may be hermetically sealed together within the process fluid, as shown in FIG. 6.

Figure 6:
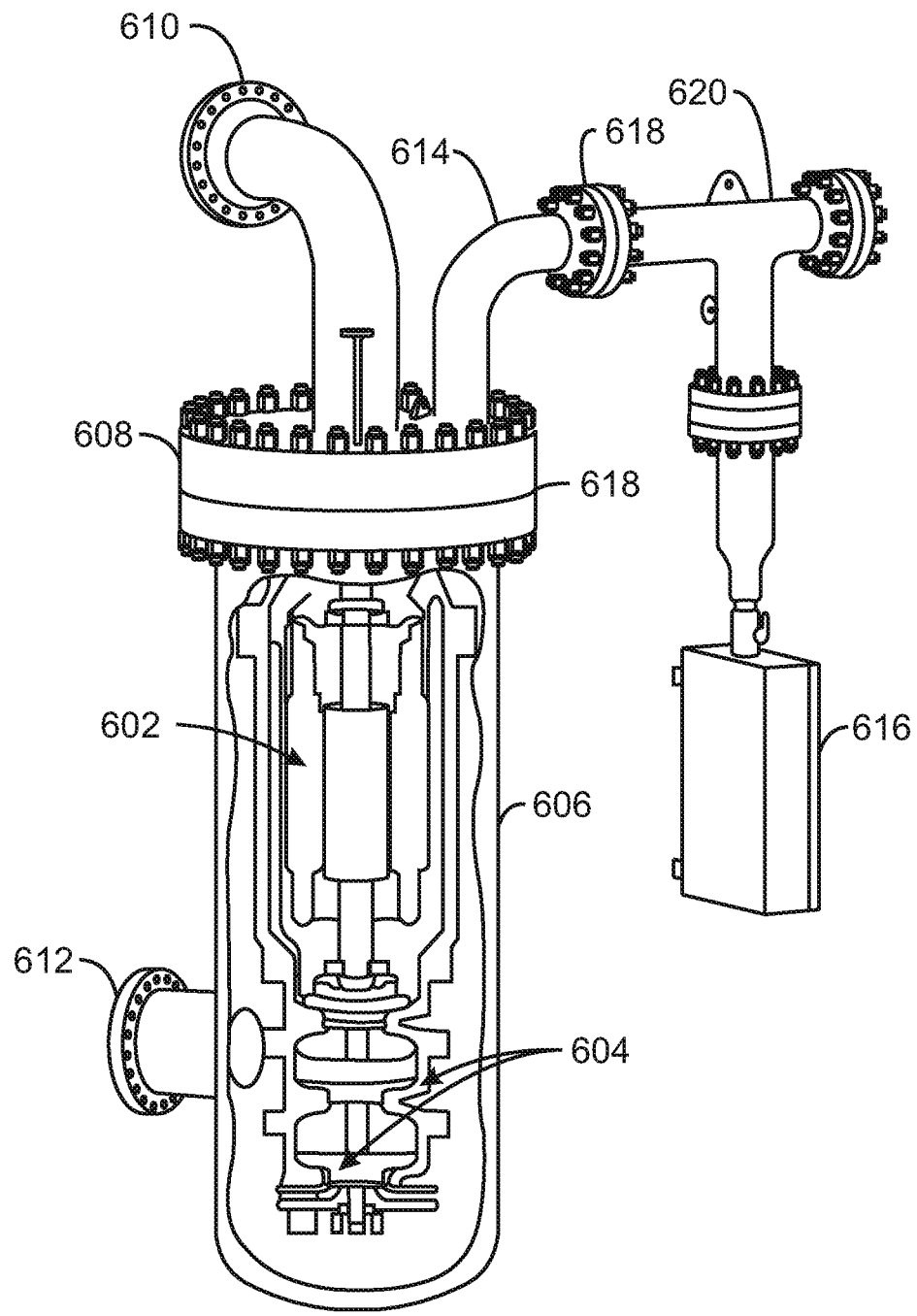
FIG. 6 is an illustration of a canned liquid turbine/generator.

FIG. 6 is an illustration of a canned liquid turbine/generator 600. As shown in FIG. 6, both the generator 602 and the liquid turbine 604 are located inside a single vessel 606. The vessel 606 has a head 608 that couples to a fluid inlet 610. From the fluid inlet 610, the process fluid (such as LNG or a refrigerant) can flow through the vessel 606, around the generator 602, and through the wheels of the liquid turbine 604. The process fluid then exits the vessel through a fluid outlet 612. Power from the generator 602 is removed through electrical lines that exit the head 608 through a generator power conduit 614 and electrical power feed through 616. This configuration is advantageous for the elimination of a seal 506 around a moving part, such as the shaft 508 (FIG. 5). Such seals may be less reliable than flanges 618 that are used to seal a head 608 to a vessel 606 or a pipe segment, such as conduit 614, to another pipe segment 620. The canned liquid turbine/generator 600 shown in FIG. 6 may be commercially available from Ebarra Corporation. However, the canned liquid turbine/generator 600 may only be available in limited power configurations, for example, 2.4 MW or less. Therefore, a series configuration may be used to obtain sufficient capacity, such as three, four, five, six, seven, or more units in series. Further, current techniques for sparing units in place in case of unit failures often use a spare for each installed unit, at a substantial cost.

Multiple Turbines in Series or Series/Parallel

As noted above, exemplary embodiments of the present techniques utilize multiple liquid turbines in series or series-parallel to achieve total pressure let down and mass flow requirements for a given process. The process may be of any type, configuration, or design. The process fluid may also be a hydrocarbon or a non-hydrocarbon. In an exemplary embodiment, the process fluid is a hydrocarbon, such as LNG. The thermodynamic properties of the process fluid at the inlet or exit of any liquid turbine will be a dependent combination, for example, a higher temperature may correspond to a higher pressure, or a lower pressure may correspond to a lower temperature. The fluid mass flow is dependent on the desired pressure and temperature from the output. In other words, a longer series of liquid turbines may result in a lower temperature and pressure than a shorter series of liquid turbines for an equivalent flow rate.

Figure 7:
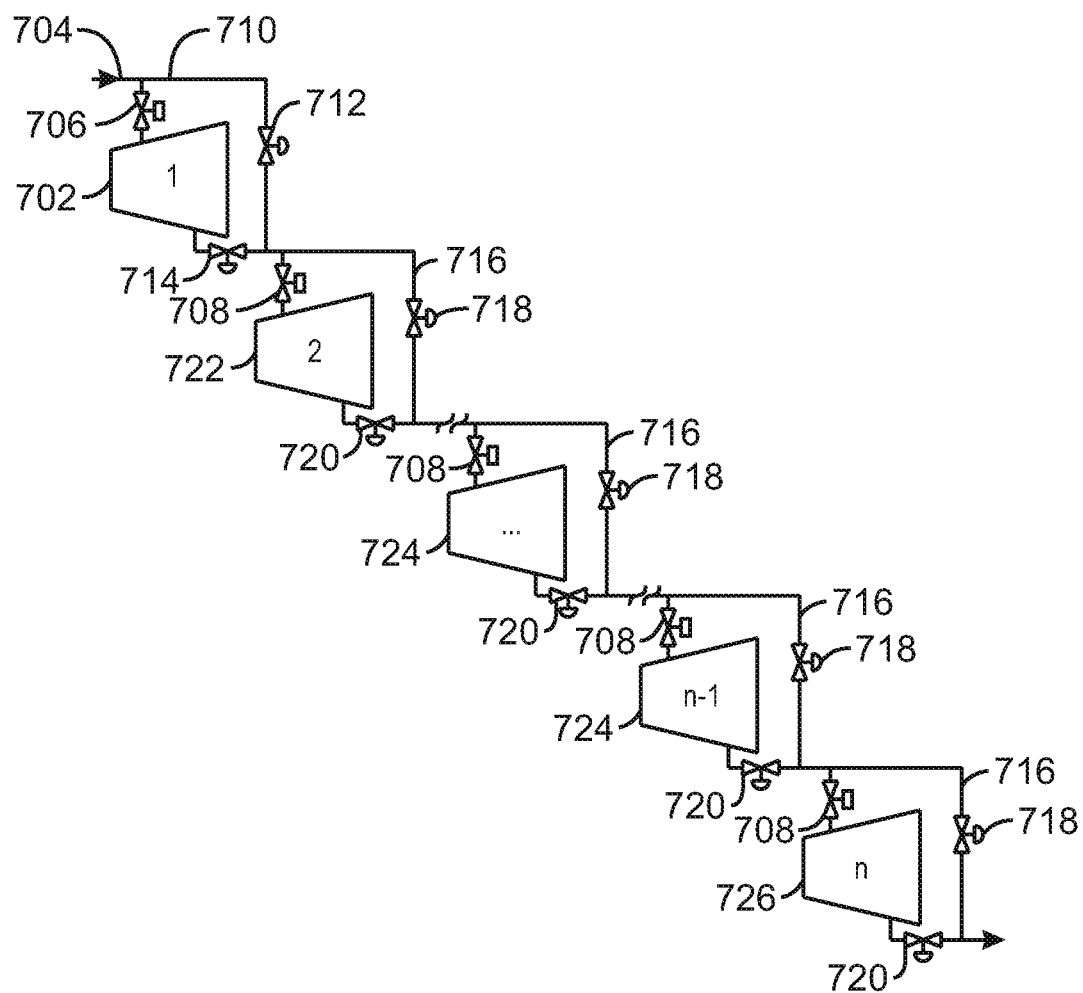
FIG. 7 is a schematic diagram illustrating a series of liquid turbines.

FIG. 7 is a schematic diagram illustrating a series 700 of liquid turbines. This arrangement may be used in a process where the let down pressure exceeds that of current hydraulic turbine technology. The fluid inlet of the first liquid turbine 702 in the series is coupled to an inlet line 704 by an actuated valve 706. The actuated valve 706 has two positions, open and closed. The actuated valve 706 can be used to open the feed to the turbine 702. Similar actuated valves 708 are positioned on the fluid inlet to each of the subsequent liquid turbines in the series 700. A bypass line 710 allows the feed to flow around the liquid turbine 702. The flow in the bypass line 710 can be adjusted by a control valve 712, which may be used in concert with a control valve 714 on the fluid outlet of the liquid turbine 702 to adjust the pressure, temperature, and flow of the liquid from the liquid turbine 702. Similar bypass lines 716, bypass control valves 718, and fluid-outlet control valves 720 may be used to adjust the flow rates through each of the subsequent liquid turbines in the series 700.

The fluid inlet of the second liquid turbine 722 in the series 700 is coupled to the fluid outlet of the first liquid turbine 702 in the series 700. The fluid inlet of each of the following liquid turbines 724 in the series 700 is coupled to the fluid outlet of the proceeding liquid turbine, until the final liquid turbine 726 in the series. The arrangement of the liquid turbines in the series 700 may decrease costs by allowing the remaining turbines in the series 700 to cover a failure of any one liquid turbine in the series. Further, the internal components of each the liquid turbines 702, 722, 724, and 726 may be of the same design. This may facilitate operation while a turbine is off-line by permitting efficient operation of the system, for example by each stage shifting up in pressure, with a Joule-Thompson valve handling the low pressure drop while the by-passed turbine is under repair. Such a design may further improve costs by allowing parts to be interchangeable between the liquid turbines 702, 722, 724, and 726. In an exemplary embodiment, the series 700 is designed to have extra capacity, so that there is no net reduction in throughput if a single turbine should fail. In some embodiments, the capacity of the series may be designed so that there is a proportional reduction in total throughput for each turbine that fails. Further gains in capacity and reliability may be obtained by placing the series 700 in parallel with other series, as illustrated in FIG. 8.

Figure 8:
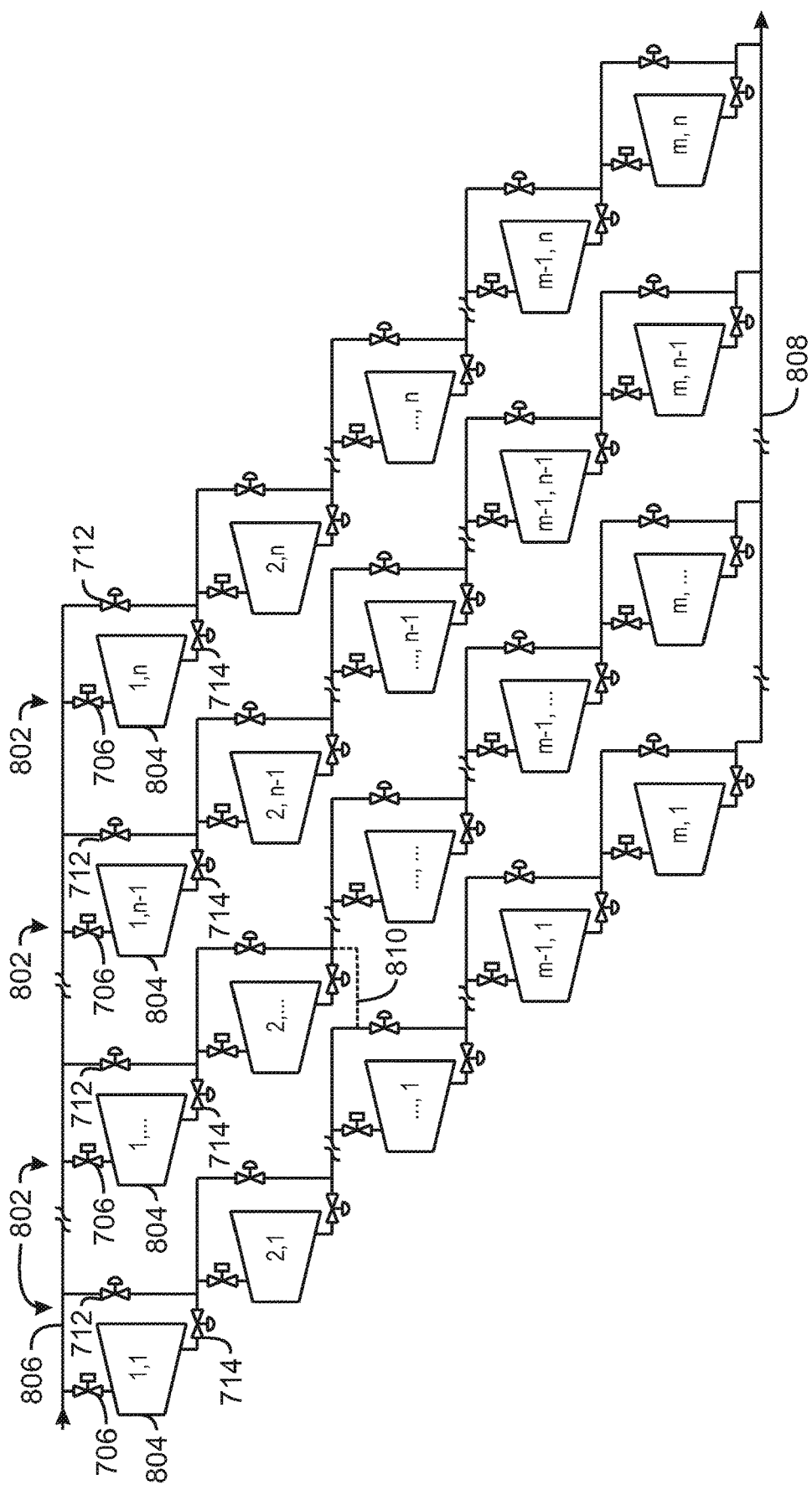
FIG. 8 is a schematic diagram illustrating a series-parallel arrangement 800 of liquid turbines.

FIG. 8 is a schematic diagram illustrating a series-parallel arrangement 800 of liquid turbines. In the series-parallel arrangement 800 shown in FIG. 8, four individual series 802 are arranged in parallel. Each of the series 802 are interconnected as shown in the series 700 discussed with respect to FIG. 7. In other words, every liquid turbine 804 in the series-parallel arrangement 800 can have a fluid inlet actuated valve 706, a bypass control valve 712, and a fluid outlet control valve 714. Each series 802 of liquid turbines is coupled to an inlet line 806 and an outlet line 808. If a single liquid turbine in a series 802 fails, the other liquid turbines in that series 802 may cover the deficit. More complex interconnections, as indicated by line 810 may be used in the series-parallel arrangement 800 to allow sparing of capacity across series 802, i.e., allowing liquid turbine 804 failures in one series 802 to be covered by capacity in other series 802.

Figure 9:
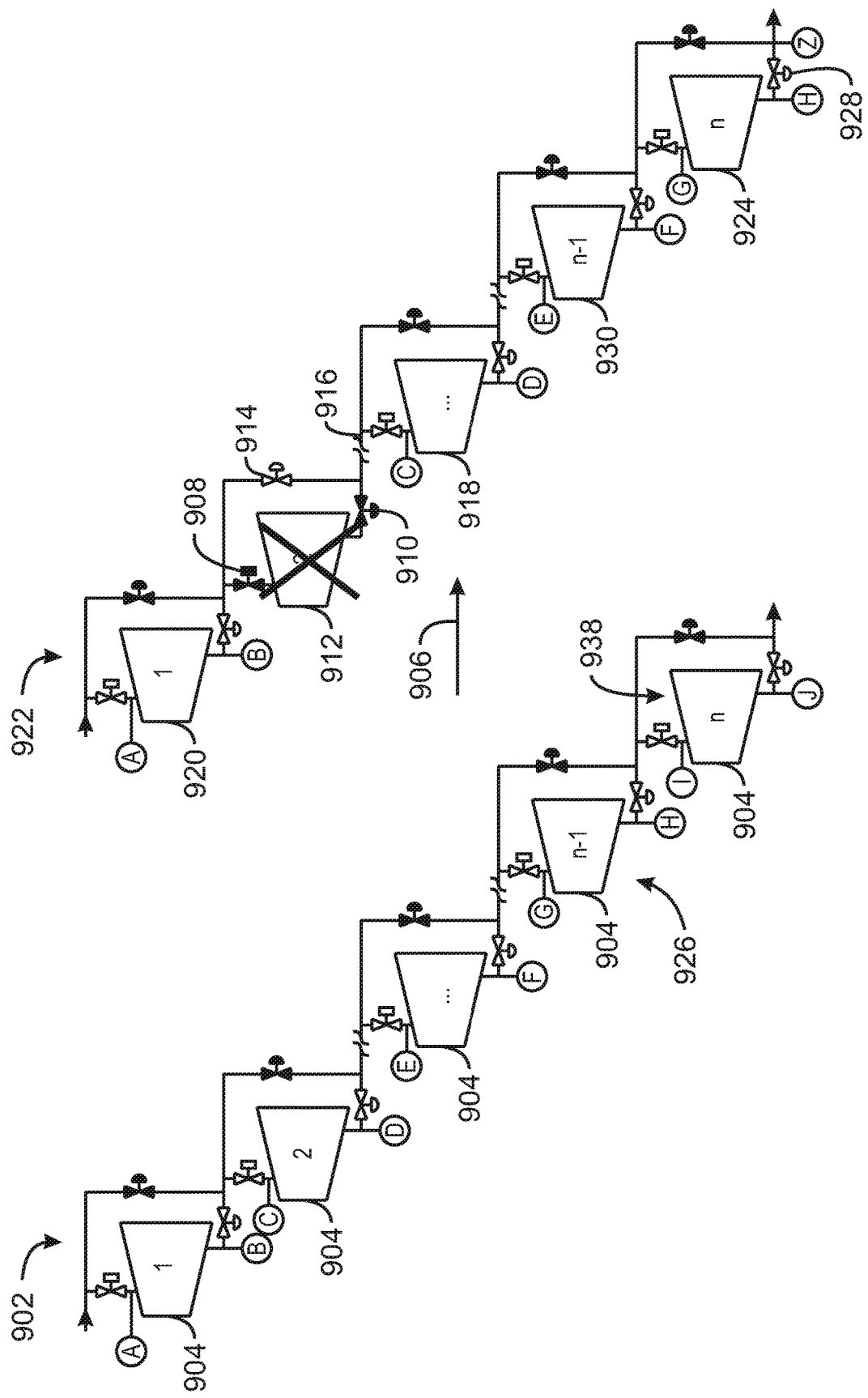
FIG. 9 is a schematic diagram showing a response to a fault in a single liquid turbine in a normally operating series.

FIG. 9 is a schematic diagram 900 showing a response to a fault in a single liquid turbine in a normally operating series 902. In an exemplary embodiment, all of the turbines 904 in a series 902 are of a common design. Each of the turbines 904 has a process inlet condition (e.g., temperature, pressure, and flow rate) indicated by A, C, E, G, and I in the diagram 900. Similarly, the process outlet condition for each turbine 904 is indicated by B, D, F, H, and J.

In normal mode 902, all turbines 904 are operating at normal design conditions with no faults or bypasses. However, if any one of the turbines 904 develops a fault and becomes inoperable, as indicated by reference numeral 906, the inlet flow valve 908 and outlet flow valve 910 of the inoperable turbine 912 can be closed, and the turbine 912 bypassed. This procedure may be performed by opening a bypass valve 914 that directs the flow to the inlet 916 of the next turbine 918 in the series 902. The inlet process conditions (e.g., C) for the next turbine 918 may be changed to operate under the same inlet process conditions as the inoperable turbine 912. The subsequent turbine operates at new process conditions that are equal or near process output conditions (e.g., B) of the preceding turbine 920.

The node of operation during a turbine fault, as shown in the schematic diagram 900, may be termed fault bypass mode 922. In an exemplary embodiment, the last operating turbine 924 in the fault bypass mode produces process fluid with exit conditions Z that are substantially the same as the outlet process conditions I of the preceding turbine 926 when operating in normal mode 902.

In normal mode 902, each turbine 904 operates at a lower differential pressure than the maximum design differential pressure for the turbine 904. Thus, in an n turbine 904 configuration, each turbine 904 would be designed to operate at a differential pressure of $\Delta P/n$ with a maximum design operation differential pressure of $\Delta P/(n-1)$. If any of the n turbines 904 incorporated by reference herein becomes inoperable (e.g., turbine 912), the series 902 enters fault bypass mode 922, and the process flow is bypassed to the turbine 918 in the sequence that follows the inoperable turbine 912. The differential pressure across each of the remaining turbines (e.g., turbines 918, 920, 924, or 930) increases from $\Delta P/n$ to $\Delta P/(n-1)$. To achieve final pressure, the exit valve 928 throttles the pressure to adjust the pressure set point of the system exit.

This may be seen in Table 1, which shows the pressure drop across each turbine in a series of n turbines. In this example, the second turbine in the series failed, as shown in the column labeled. In Table 1, $\Delta P_t$ represents a single turbine differential pressure, $\Delta P$ represents the total system differential pressure, and n represents the total number of the turbines in a given system of turbines.

TABLE 1

Pressure drop across turbines in series

| Turbine | Normal $\Delta P_t$ | Bypass $\Delta P_t$ |
|---|---|---|
| 1 | $\Delta P/n$ | $\Delta P/(n-1)$ |
| 2 | $\Delta P/n$ | 0 |
| ... | $\Delta P/n$ | $\Delta P/(n-1)$ |
| n − 1 | $\Delta P/n$ | $\Delta P/(n-1)$ |
| n | $\Delta P/n$ | $\Delta P/(n-1)$ |

In another exemplary embodiment, the last operating turbine 924 in the fault bypass mode 922 produces process fluid with exit conditions Z that are substantially the same as the outlet process conditions J of the last turbine 938 when operating in normal mode 902. In this exemplary embodiment of the fault bypass mode 922, extra capacity is designed into turbines 904 of the series 902 to provide sparing capacity in case of a fault. This can be contrasted to current plant designs, which often place a spare unit in parallel to each operating unit, which may be activated when the operating unit has a fault. Accordingly, the use of sparing capacity in a plant may substantially reduce costs over current plant designs.

In another exemplary embodiment, the system configuration of turbines is in series and parallel, as discussed with respect to FIG. 8. In this embodiment, if a turbine fault occurs, each series may function as an independent group that has spare capacity. Thus, the downstream manifold pressure (i.e., after the last turbine exit valve of each series of turbines) of the parallel (row) sets of turbines in series can be set equal to a pressure drop in the exit valve of the last turbine in the series set in which a turbine has become inoperable. In some embodiments, as discussed with respect to FIG. 8, cross connections between series that are in parallel with each other may be used to share capacity between different series, providing further options for shifting a load in case of a failure.

Control Systems for Series and Series/Parallel Turbine Operation

The turbine sparing described above uses a control system that can control the turbines both in normal operations and in the fault bypass mode. The control system can be designed to control start-up and shutdown of a multiple turbine series, normal plant operations, changes in plant loading, and operational changes in the event of a turbine failure.

Figure 10:
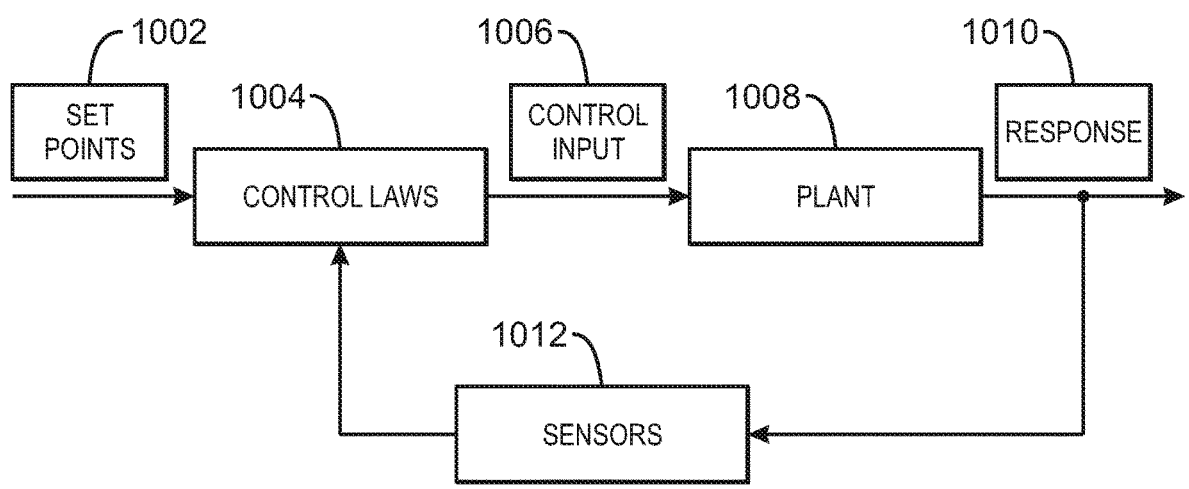
FIG. 10 is a block diagram of a plant control system.

FIG. 10 is a block diagram of a plant control system 1000. As shown in FIG. 10, one input to the plant control system 1000 is a group of set points 1002. The set points 1002 are dictated by process requirements and may be primarily governed by LNG facility throughput or facility mass flow rate. The set points 1002 are used as an input to control laws 1004, which may be operable in a plant control system, as discussed with respect to FIG. 11. The process control laws 1004 are the mathematical relationships between the set points 1002 and the actual control inputs 1006 used to effect the set points 1002 in the plant 1008. The control inputs 1006 are inputs to the controllable components of the plant 1008. For example, a control law 1002 may state how much a set of control inputs 1006 should be changed to achieve a selected throughput in the plant 1008. The control inputs 1006 may include the opening or closing of process flow valves, the coupling of electrical generators on the turbines to the plant grid, the current operational status of the plant, and the like.

The response 1010 of the plant 1008 to the changes in control input 1006 can be measured with various sensors 1012. The sensors 1012 may include temperature sensors, mass flow meters, pressure sensors, differential pressure sensors, level sensors, and the like, as discussed in further detail with respect to FIGS. 11A and 11B. The output from the sensors 1012 may be incorporated as feedback into the control laws 1004, along with the set points 1002. The control laws 1004 can be designed to meet the primary objectives of the plant, e.g., by controlling start-up, normal operation, shut-down, faults in a variable frequency drive, and faults in turbines. This is discussed further with respect to FIGS. 12-17.

Figure 11A:
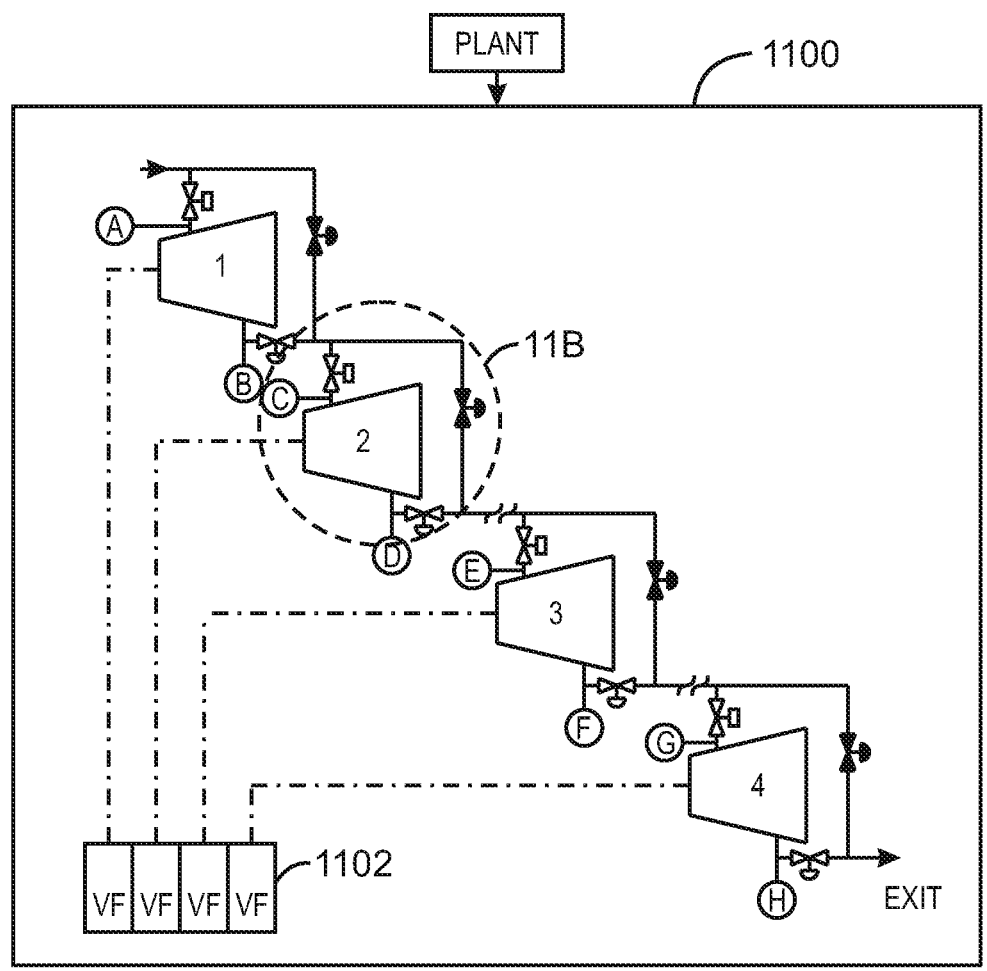
FIG. 11A is a schematic diagram of a series of turbines in a LNG plant.

FIG. 11A is a schematic diagram of a series 1100 of turbines in a LNG plant. For clarity, the plant configuration shown has been simplified to show a series configuration with four turbines. Each of the turbines 1-4 is coupled to a corresponding variable frequency generator 1102.

Figure 11B:
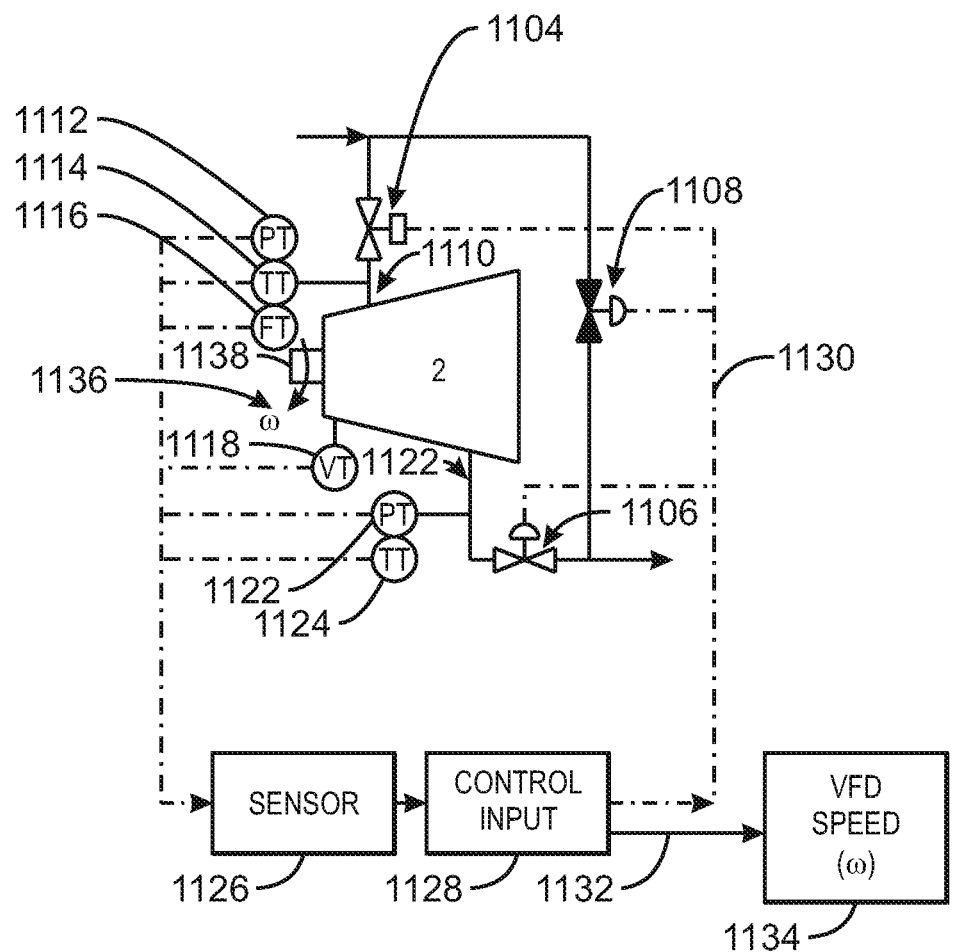
FIG. 11B is a detail of one turbine from the series of turbines shown in FIG. 11A, showing the coupling of the turbine to the associated sensors and generator.

FIG. 11B is a detail of one turbine 2 from the series 1100 of turbines shown in FIG. 11A, showing the coupling of the turbine 2 to the associated sensors and generator. The inlet valve 1104, exit valve 1106, and bypass valve 1108 associated with the turbine 2 are also shown. As shown, the inlet valve 1104 may be an actuated two position (open/closed) valve, such as a piston motor valve (PMV). The exit valve 1106 and bypass valve 1108 may be control valves that allow the amount of flow to be adjusted, such as diaphragm motor valves (DMVs). A variety of sensors may be positioned after the inlet valve 1104, at the inlet 1110 to the turbine 2. These sensors may include an inlet pressure transmitter (PT) 1112, an inlet temperature transmitter (TT) 1114, and an inlet flow transmitter (FT) 1116. A vibration transmitter (VT) 1118 can be used to monitor the turbine 2 for excessive vibration, which may indicate a fault, or problem, in the turbine 2.

On the outlet 1120 of the turbine 2, before the outlet valve 1106, sensors may be used to determine the change in the fluid characteristics as a result of flowing through the turbine 2. The outlet sensors can include an outlet PT 1122 and an outlet TT 1124. The configuration of valves and sensors shown for turbine 2 may be the same for each of the turbines in the plant, making the turbines operationally interchangeable. Using the same configuration can also make servicing the turbines easier, as all parts are interchangeable.

Any number of technologies may be used in the various sensors, as would be know in the art. For example, the pressure transmitters 1112 and 1122 may include strain gauge and thin film technologies, among others. The temperature transmitters 1114 and 1124 may include thermocouples, resistance temperature detectors, and the like. The flow transmitters 1116 may include orifice meters, mass flow meters, and the like. The vibration transmitter 1118 may include an accelerometer, a velocimeter, or a proximity probe, among others.

The sensors 1112, 1114, 1116, 1118, 1122, and 1124 can be coupled to a sensor processor 1126 that feeds the sensor information to a controller 1128. Both the sensor processor 1126 and the controller 1128 may include any number of different plant control systems or computers, including, for example, a distributed control system (DCS), a direct digital controller (DDC), a programmable logic controller (PLC), and any number of similar units. In an exemplary embodiment, both the sensor processor 1126 and the controller 1128 are contained within a plant wide DCS. Appropriate DCS units may be available from Honeywell, Emerson, ABB, Yokogawa, Siemens, and many other manufacturers.

The controller 1128 takes the sensor information and control laws (as discussed with respect to FIG. 10) and provides control signals to operate the valves 1104, 1106, and 1108, as indicate by a dashed line 1130. The controller 1128 also provides control signals 1132 to the variable frequency drive (VFD)/speed controller 1134. The VFD/Speed controller 1134 can adjust the frequency of power generated by the angular speed (v) 1136 of the shaft 1138 of the turbine 2. The VFD/Speed controller 1134 may also be used to control the angular speed 1136 of the turbine 2. Control of the angular speed 1136 may be used to adjust the frequency of power generated by a generator if the VFD has a fault. The control of the frequency may allow a direct connect of the generator with an electric grid, as discussed in further detail below.

The sensors 1112, 1114, 1116, 1118, 1122, and 1124, sensor processor 1126, controller 1128, valves 1104, 1106, and 1108, and VFD/Speed controller 1134 are used to adjust the parameters of the plant to achieve specific operational goals, such as startup, shutdown, and fault compensation. Thus, as an ensemble, these units may be termed the control system for the turbine 2. Similar control systems may be used for other turbines throughout the plant. In addition to the individual turbine controllers as depicted in FIG. 11B, a single master controller is employed to receive input conditions from the LNG plant controller (DCS). The master controller is designed to provide simultaneous setpoints to the multiple individual turbine controllers for optimal and efficient turbine operation. The master controller may be a standalone PLC receiving command setpoints from the DCS or embedded directly within the LNG plant DCS. As used herein, the term "control system" encompasses all of the turbine control systems in the plant. Further, it may be understood that the control system operations discussed with respect to FIGS. 11-16, below, take place within the context of a larger LNG plant. In other words, one of ordinary skill in the art will recognize that numerous other operations are taking place throughout the plant proximate to the operations discussed below.

Figure 12:
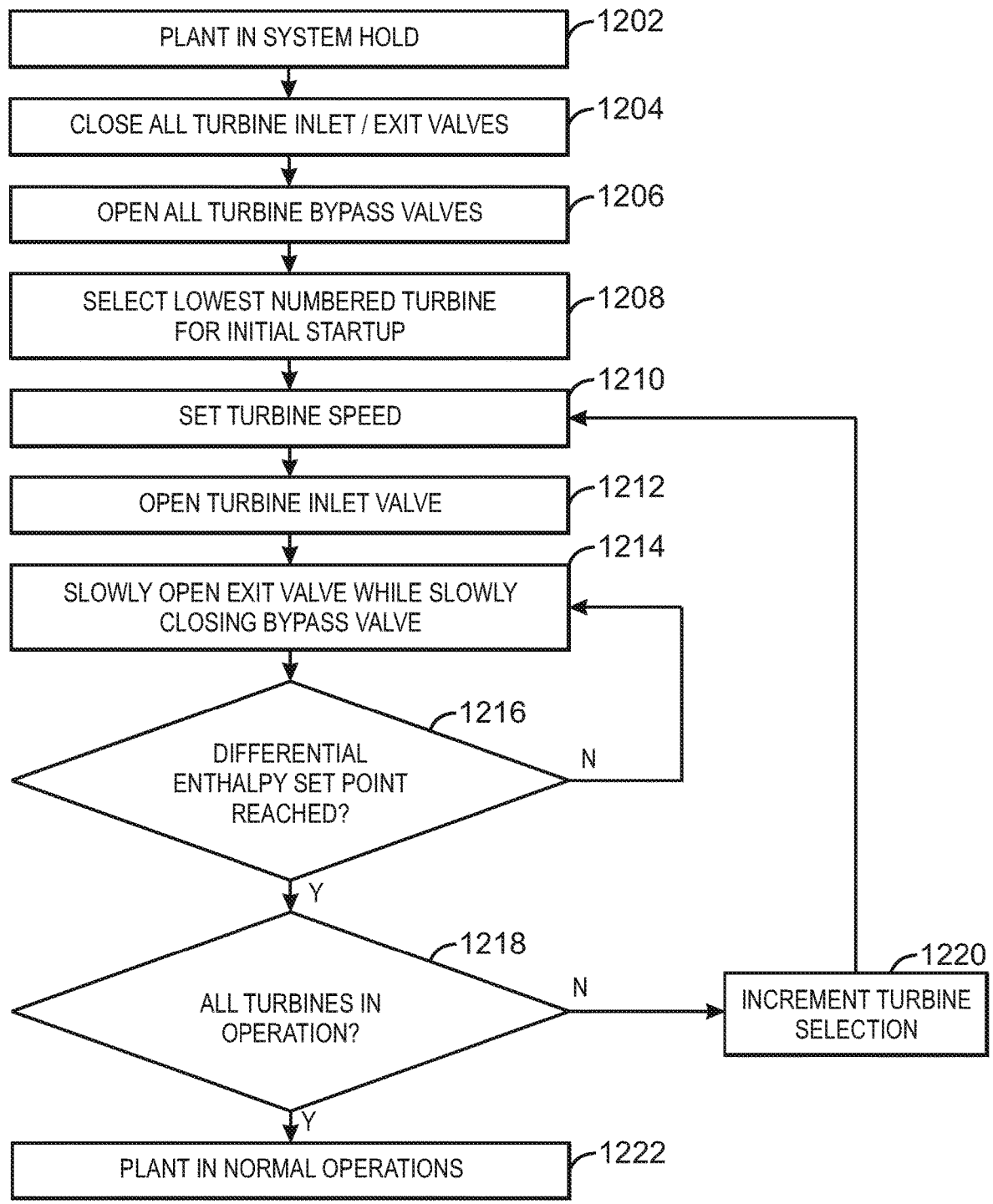
FIG. 12 is a process flow diagram showing a method for starting a series of liquid expansion turbines in a LNG plant.

FIG. 12 is a process flow diagram showing a method 1200 for starting a series of liquid expansion turbines in a LNG plant. The goal of the startup procedure is to make a smooth transition from a plant in a system hold to normal operations. To effect the startup, the control system monitors the mass flow rate and the inlet and outlet pressures and temperatures for each turbine. Based on the measured values, the control system adjusts inlet and exit valves, the bypass control valves, and the turbine speed.

The method begins at block 1202 with the plant in a system hold. At block 1204, the turbine inlet/exit valves are closed and, at block 1206, all turbine bypass valves are opened. At block 1208, the lowest numbered turbine is selected for startup, for example, turbine 1 in the series discussed in FIG. 11A.

At block 1210, the turbine speed set point for the turbine being started is selected for control purposes during startup. The turbine inlet valve is opened at block 1212. The exit valve is then slowly opened while the bypass valve is slowly closed at block 1214. At block 1216, the control system determines if a differential enthalpy set point has been reached for the turbine. If not, process flow returns to block 1214 to continue adjusting the valves. Once the differential enthalpy set point has been reached, process flow proceeds to block 1218 to determine if all turbines have been started up. If not, the current turbine that is being started is incremented by one at block 1220 and startup proceeds to the next turbine in the series. Process flow then resumes at block 1210 for the selected turbine.

If all turbines have been started up, process flow proceeds from block 1218 to block 1222. At block 1222, the plant is in normal operations, as discussed with respect to FIG. 13.

Figure 13:
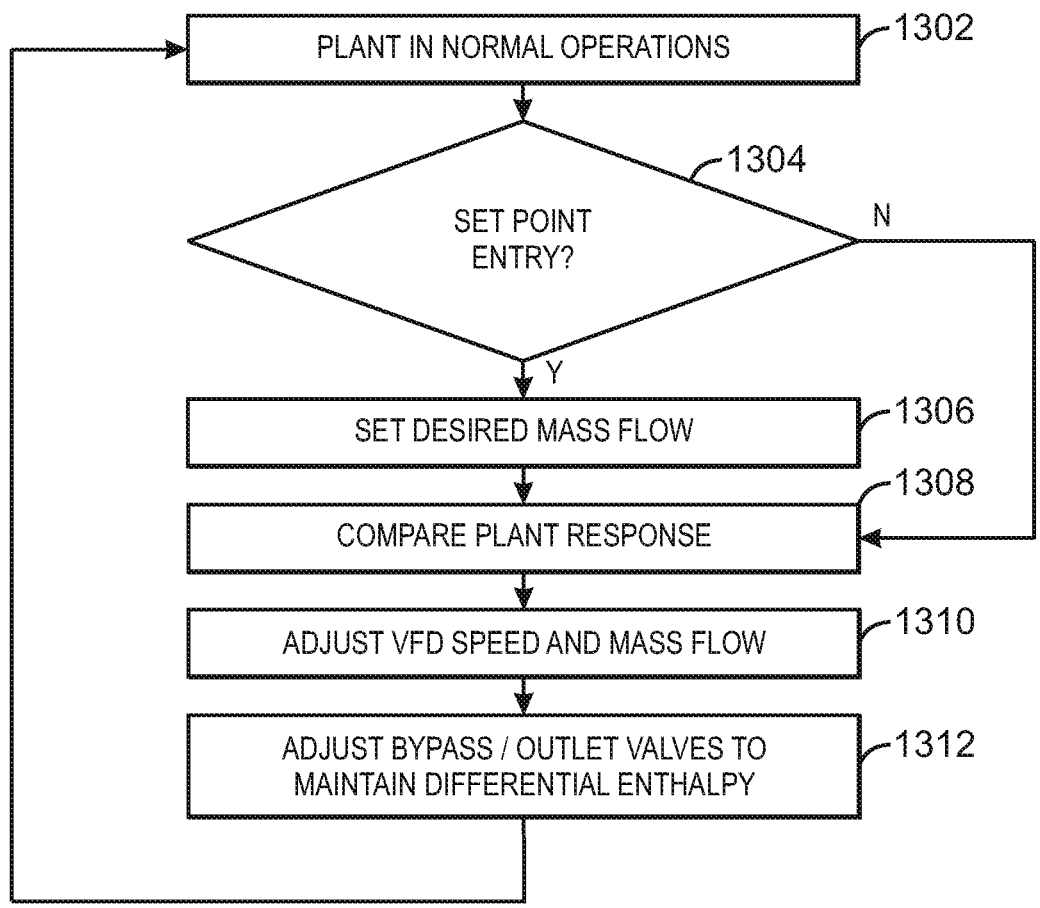
FIG. 13 is a process flow diagram showing a method for normal operation in a series of liquid expansion turbines in a LNG plant.

FIG. 13 is a process flow diagram showing a method 1300 for normal operation in a series of liquid expansion turbines in a LNG plant. The focus of the control system during normal operations is to provide equivalent differential enthalpy (power) and optimize the efficiency of the process. The method 1300 begins at block 1302 with the plant in normal operations, for example, after startup is complete. At block 1304, the control system determines if any set points have changed. If so, flow proceeds to block 1306 where a new set point for mass flow through a turbine is calculated or entered based on the set point selected. For example, if an operator sets a new value for differential enthalpy, the control system may calculate a new mass flow set point. Similarly, if an operator directly enters a new set point for mass flow through the series of turbines the control system may adjust the mass flow through the individual turbines to achieve the set point. After any setpoint changes have been made at block 1306, or if no set point entry is made at block 1304, flow proceeds to block 1308.

At block 1308, the current plant responses are compared to the set points. The control system then adjusts the VFD/speed control and mass flow values to achieve the mass flow set point at block 1310. At block 1312, the bypass valve and outlet valve are adjusted to maintain a differential enthalpy across the turbine. Flow then returns to block 1302 to continue normal operations.

Figure 14:
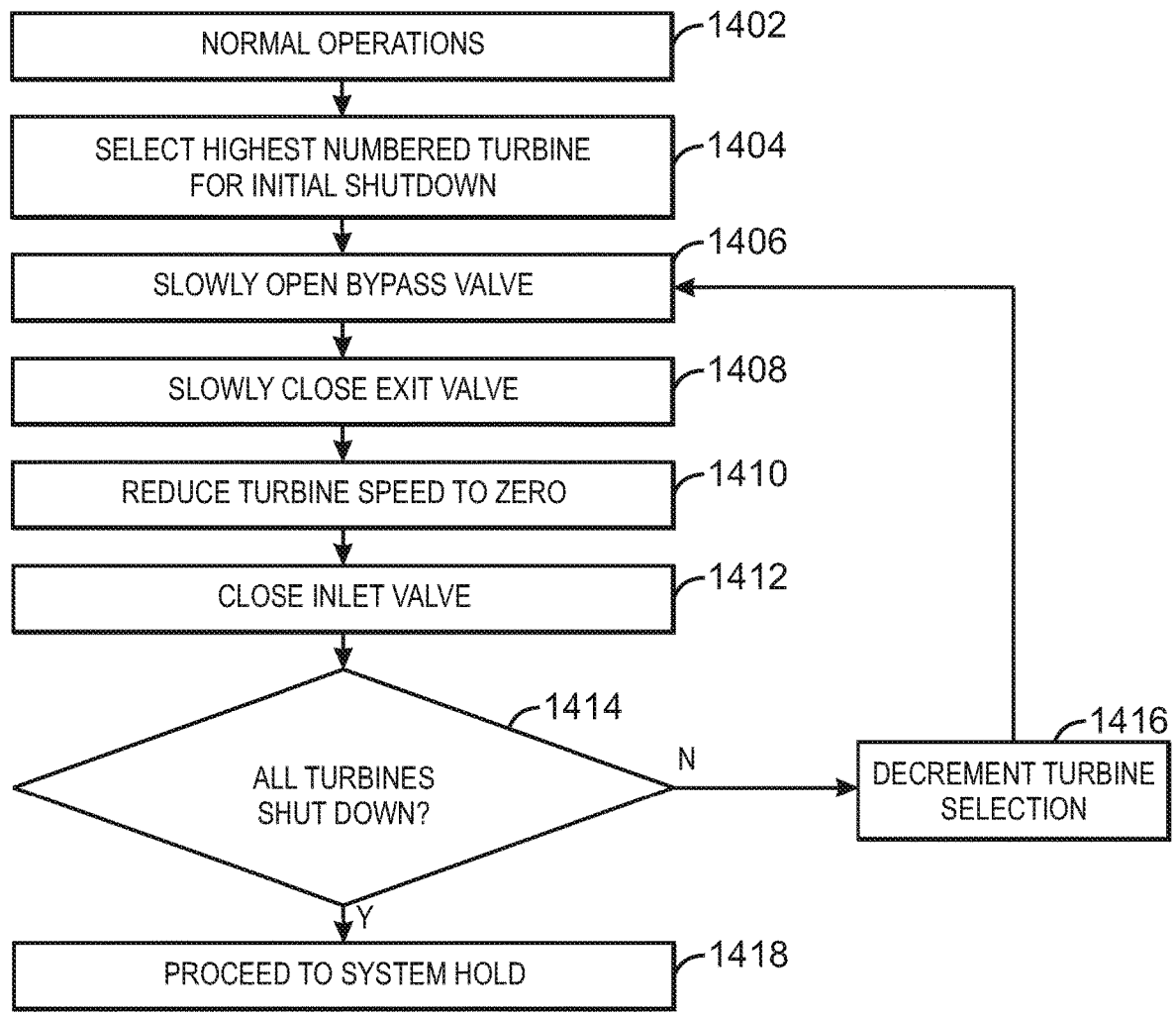
FIG. 14 is a process flow diagram showing a method for shutting down a series of liquid turbines in a LNG plant.

FIG. 14 is a process flow diagram showing a method 1400 for shutting down a series of liquid turbines in a LNG plant. The goal of the shutdown procedure is to make a smooth transition from an operational state to a system hold. The method begins at block 1402 with the plant in normal operations. It should be understood that this could include a state in which the plant has had one or more turbines taken off-line, due to faults in the turbines or VFDs, servicing of the turbines or VFDs, or various other reasons. Further, the plant may be in a normal operational state with respect to the turbines, but may have other reasons for shutdown, including plant turnarounds, supply interruptions, and the like.

From normal operations, flow proceeds to block 1404, at which the highest numbered (or last) turbine in the series is selected for shutdown. For example, turbine 4 in FIG. 11A may be the first turbine selected for shutdown. At block 1406, the bypass valve around the turbine is slowly opened. At block 1408, the exit valve from the turbine is slowly closed. The turbine speed is reduced to zero at block 1410. The operations at blocks 1406, 1408, and 1410 may be performed together in an incremental fashion, to slowly take the turbine off-line. In other words, as the bypass is slowly opened, the exit valve may be slowly closed while the speed of the turbine is slowed. Once the turbine speed is at zero, the inlet valve is closed at block 1412.

At block 1414, the control system determines if all turbines in the series have been shut down. If not, the turbine selection is decremented by one at block 1416 to choose the next prior turbine in the series. Flow then returns to block 1406 to shut down the selected turbine. Once all turbines in a series have been shutdown, flow proceeds to block 1418, at which point the plant is in a system hold.

An advantage of the techniques disclosed herein is the ability of the plant to adapt to fault conditions (such as equipment failures) while remaining in, or close to, normal operations without the expense of installing large amounts of redundant equipment. This is discussed further with respect to FIG. 15.

Figure 15:
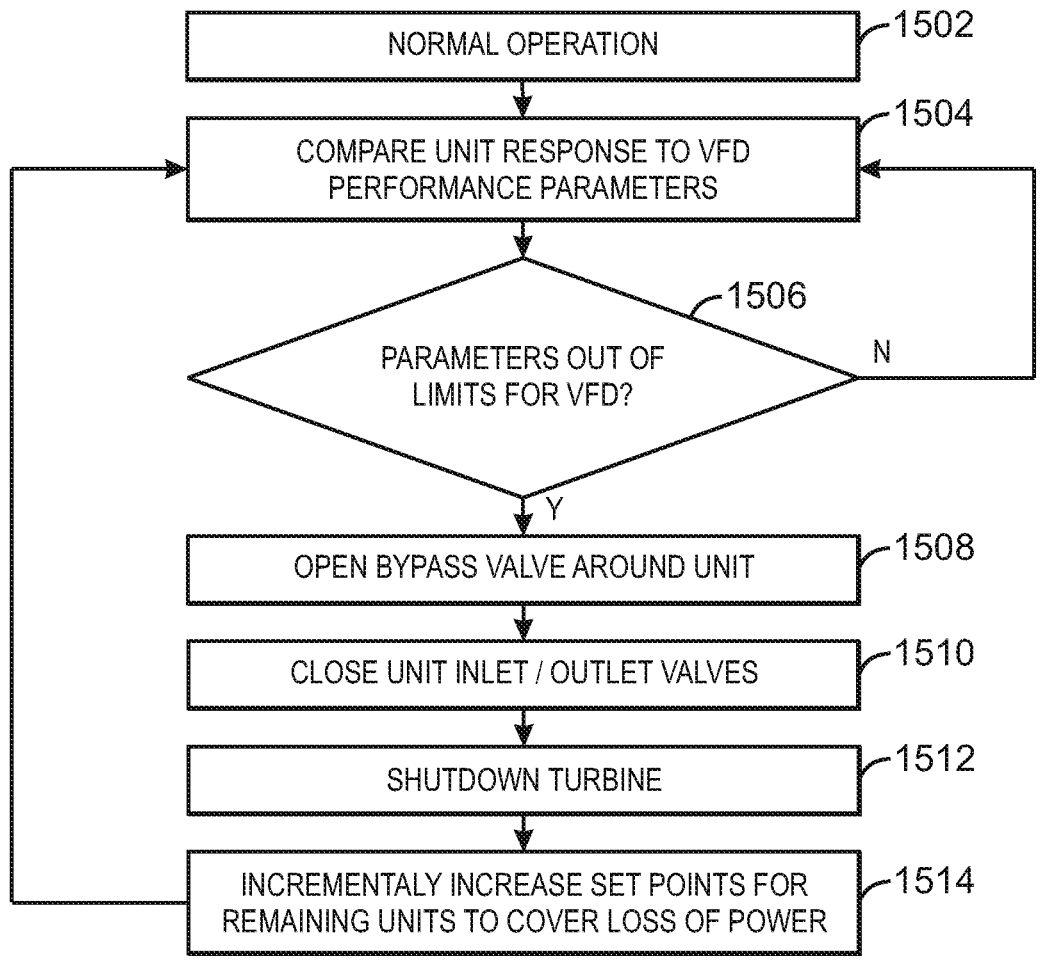
FIG. 15 is a process flow diagram showing a method for responding to a VFD fault in a series of liquid turbines in a LNG plant.

FIG. 15 is a process flow diagram showing a method 1500 for responding to a VFD fault in a series of liquid turbines in a LNG plant. The goal of the method 1500 is to take the turbine and VFD off-line for example, to perform repairs. To implement this goal, the method 1500 implements a controlled turbine flow bypass, shutdown faulted VFD and turbine, adjusts the remaining operational turbines to attempt to achieve equivalent differential enthalpy (power), and optimize the efficiency of the series of turbines.

The method 1500 begins at block 1502 with the plant in normal operations. As described above, this does not mean that the plant is fully operational or that all turbines are rutting. At block 1504, the control system compares the VFD/Speed control operational response to the previously set VFD performance parameters, for example, as provided by a manufacturer. If at block 1506, the parameters are within the performance limits, flow returns to block 1504. It should be appreciated that this determination is operating in parallel to the normal operations method 1200, discussed with respect to FIG. 12. If the parameters are out of the performance limits at block 1506, flow proceeds to block 1508.

At block 1508, the bypass valve around the unit is fully opened to allow fluid to flow around the turbine. The turbine outlet valve is slowly shut at block 1510, followed by closing the inlet valve. At block 1512 the turbine is shutdown, for example, by bring the rotational speed of the turbine to zero. The set points of the remaining operational turbines may then be adjusted at block 1514 for the loss of the turbine. The adjustment may include setting new mass flow set points and differential enthalpy set points for the operational turbines. Flow may then resume at block 1504 to continue monitoring operations of other units. If any further VFD faults, then the operations may be repeated to shut down further turbines. However, one of ordinary skill in the art may recognize that even though the overall plant may remain operational, the loss of two or more turbines in a series may affect production rates. Therefore, an operator may choose to keep a turbine on-line, while directly coupling its associated generator to an electric grid, as discussed with respect to FIG. 16.

Figure 16:
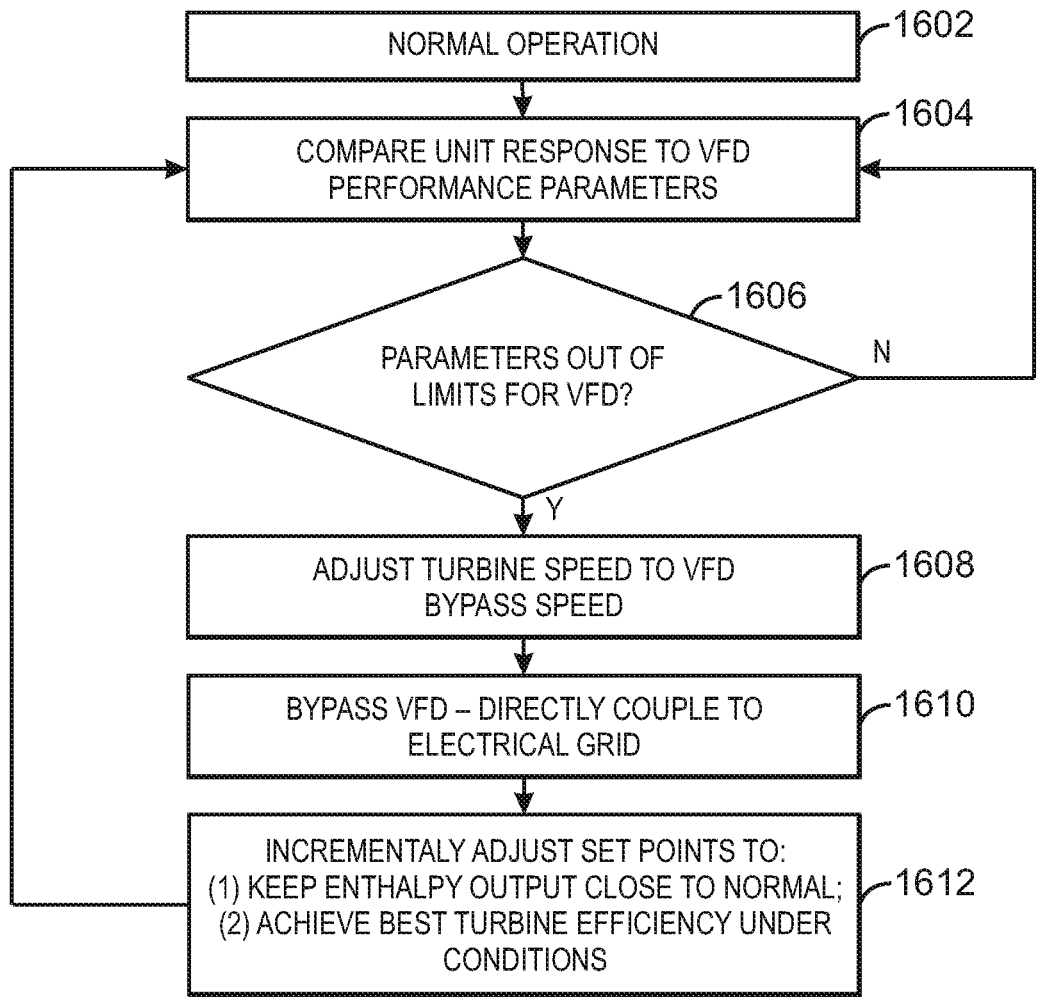
FIG. 16 is a process flow diagram showing a method for bypassing a VFD and directly coupling a generator to the electrical grid in a LNG plant.

FIG. 16 is a process flow diagram showing a method 1600 for bypassing a VFD and directly coupling a generator to the electrical grid in a LNG plant. The goal of the method 1600 is to keep a turbine that has a VFD fault on-line. Keeping the turbine on-line may allow the overall plant production rates to remain higher than if the turbine/generator having a VFD fault is taken off-line, as discussed with respect to FIG. 15. The method begins at block 1602, with the plant in normal operations. As for the method discussed with respect to FIG. 15, the method below works in parallel with normal operations, e.g., the operations discussed with respect to FIG. 13. At block 1604, the response of the VFD is compared to the preset VFD performance requirements. If, at block 1606, the performance parameters for the VFD are within the acceptable limits (for example, the frequency of the produced power is within 0.5% of a target frequency), process flow returns to block 1604. However, if the performance parameters are outside of acceptable limits, and the operator chooses to keep the turbine on-line, process flow proceeds to block 1608. At block 1608, the speed of the turbine is adjusted to the VFD bypass speed. In other words, the VFD bypass speed is the speed at which the generator will produce power at the target frequency (e.g., 50 or 60 Hz). Once the speed is achieved, at block 1610, the VFD is bypassed and the generator is directly coupled to the grid. At block 1612, the control system proceeds to incrementally adjust the set points for other turbines in the series to keep the enthalpy output as close as practicable to the target set point. Further, the turbines in the series are adjusted to achieve the highest efficiency possible under the operational conditions. Process flow may then return to block 1604, where the control system monitors the remaining operational VFDs for faults. If any further VFD faults, then the operations may be repeated, or the method 1500 of FIG. 15 may be performed to take the turbine off-line.

Figure 17:
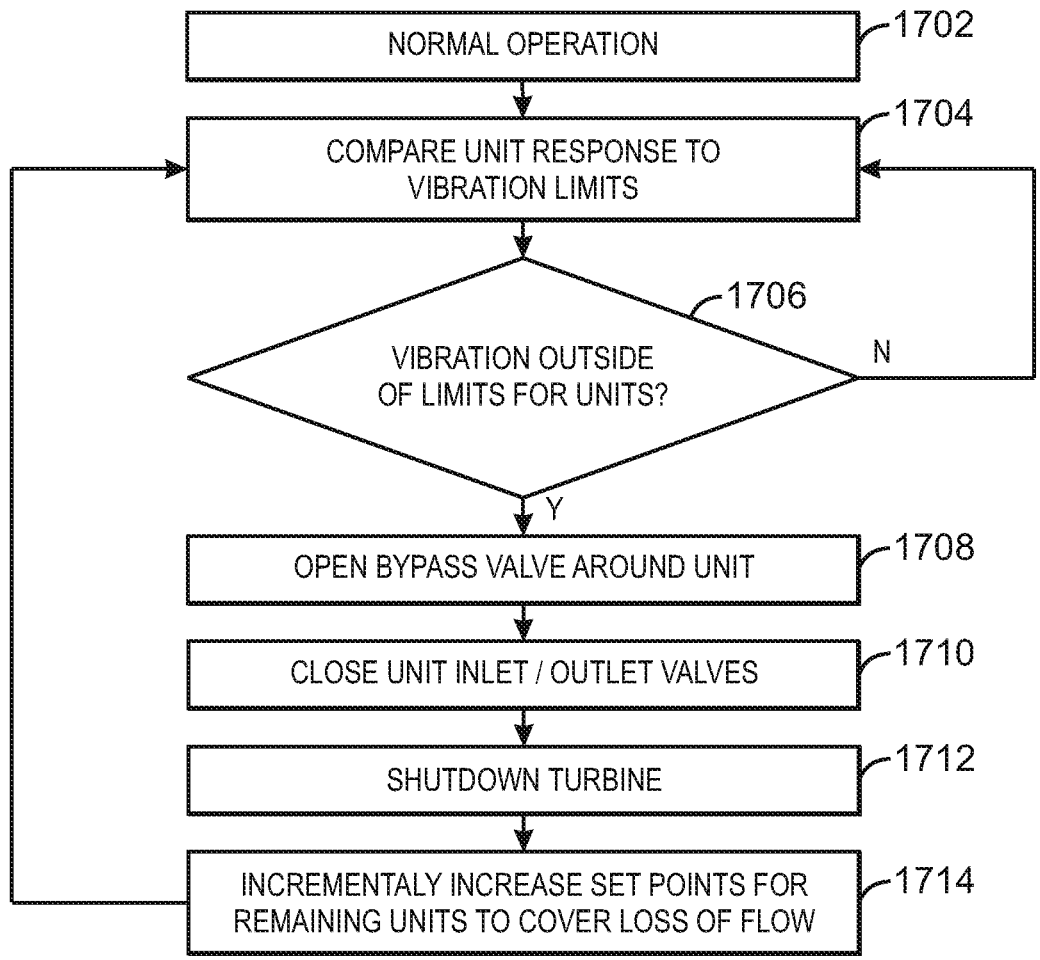
FIG. 17 is a process flow diagram showing a turbine bypass procedure in a LNG plant, for example, if a turbine is vibrating excessively.

FIG. 17 is a process flow diagram showing a turbine bypass procedure in a LNG plant, for example, if a turbine is vibrating excessively. FIG. 17 is a process flow diagram showing a method 1700 for responding to a VFD fault in a series of liquid turbines in a LNG plant. The goal of the method 1700 is to take the turbine and VFD off-line, for example, to perform repairs. To implement this goal, the method 1700 implements a controlled turbine flow bypass, shutdown faulted VFD and turbine, adjusts the remaining operational turbines to attempt to achieve equivalent differential enthalpy (power), and optimize the efficiency of the series of turbines.

The method 1700 begins at block 1702 with the plant in normal operations. As described above, this does not mean that the plant is fully operational or that all turbines are running. At block 1704, the control system compares the vibrational response of a turbine to a previously set vibration performance parameters, for example, as provided by a manufacturer. If at block 1706, the parameters are within the performance limits, flow returns to block 1704. It should be appreciated that this determination is operating in parallel to the normal operations method 1300, discussed with respect to FIG. 13. If the parameters are out of the performance limits at block 1706, flow proceeds to block 1708.

At block 1708, the bypass valve around the unit is fully opened to allow fluid to flow around the turbine. The turbine outlet valve is slowly shut at block 1710, followed by closing the inlet valve. At block 1712 the turbine is shutdown, for example, by bringing the rotational speed of the turbine to zero. The set points of the remaining operational turbines may then be adjusted at block 1714 for the loss of the turbine. The adjustment may include setting new mass flow set points and differential enthalpy set points for the operational turbines. Flow may then resume at block 1704 to continue monitoring operations of other units. If any further turbine has a vibration faults, then the operations may be repeated to shut down the turbine having the fault. However, one of ordinary skill in the art will recognize that even though the overall plant may remain operational, the loss of two or more turbines in a series may affect production rates.

The present techniques are not limited to the configurations discussed above. In an exemplary embodiment, all of the turbines may be coupled to a single large VFD. The use of a single VFD may allow for the simplification of the control scheme and system, which may realize a savings in capital, installation, and maintenance costs. Further, the techniques discussed above are not limited to operations in the absence of hot-swappable spares. For example, the electrical system, including switchgear, can be arranged to allow the disconnection of any one of the turbines in fault by-pass mode, and the synchronization of an off-line, or stand-by spare turbine.

In an exemplary embodiment, a number of turbines in a series are operated at fixed speed to allow direct connection of their associated generators to the electrical grid. One or two turbines in each series can be operated with a VFD to gain the efficiency benefit of a variable speed drive. Generally, the units operating at the highest pressure or the units operating at the lowest pressure would benefit from a VFD and thus, the first turbine, the last turbine, or both may be used with a VFD. This may lower the cost of the multi-turbine series without comprising the benefits provided by variable speed control.

While the present techniques may be susceptible to various modifications and alternative forms, the exemplary embodiments discussed above have been shown only by way of example. However, it should again be understood that the techniques are not intended to be limited to the particular embodiments disclosed herein. Indeed, the present techniques include all alternatives, modifications, and equivalents falling within the true spirit and scope of the appended claims.

What is claimed is:

1. A method for generating electricity from liquid turbines, comprising:
in a normal mode, flowing a high-pressure liquid stream through a first plurality of n liquid turbines coupled in a first series, wherein, after a first turbine in the first series, an inlet of each of a second through an n−1 liquid turbine of the first series is coupled to an outlet of a preceding liquid turbine;
generating electricity from the first series by removing energy from the high-pressure liquid stream to form a low-pressure liquid stream;
bypassing any one of the first plurality of liquid turbines that has a failure while continuing to produce electricity with the remaining turbines of the first series;
removing a portion of the high-pressure liquid stream prior to the first series;
flowing the portion of the high-pressure liquid stream through a second plurality of n liquid turbines coupled in a second series in parallel with the first series, wherein, after a first turbine in the second series, an inlet of each of a second through an n−1 liquid turbine of the second series is coupled to an outlet of a preceding liquid turbine of the second series; and
generating electricity from the second series by removing energy from the portion of the high-pressure liquid stream to form another low-pressure liquid stream.

2. The method of claim 1, further comprising:
maintaining a total electrical output from the first series as a constant value when a liquid turbine is bypassed.

3. The method of claim 1, further comprising:
operating the first plurality of liquid turbines in the first series that are not bypassed to maintain a pressure, temperature, and flow rate of the low-pressure liquid stream from the first series to be the same as a pressure, temperature, and flow rate of the low-pressure liquid stream when operating in the normal mode.

4. The method of claim 1, wherein the high-pressure liquid stream comprises a liquefied natural gas.

5. The method of claim 1, further comprising:
producing liquefied natural gas (LNG) as the low-pressure liquid stream and the another low-pressure liquid stream.

6. The method of claim 1, further comprising:
driving a variable frequency drive from an electric generator coupled to one of the liquid turbines, and if the variable frequency drive fails:
adjusting a speed of the liquid turbine coupled to the electric generator to synchronize a generator frequency with a grid frequency; and
directly coupling an output of the electric generator to an electrical grid.

7. The method of claim 1, further comprising:
bypassing any one of the second plurality of liquid turbines that has a failure while continuing to produce electricity with the remaining turbines of the second series.

8. The method of claim 1, further comprising:
transferring a portion of the high-pressure liquid stream from the first series to the second series.

9. A method for producing liquefied natural gas (LNG), comprising:
flowing a high-pressure stream of LNG through a first plurality of liquid turbines coupled in a first series;
generating electricity by reducing a pressure of the high-pressure stream of LNG to form a low-pressure stream of LNG;
bypassing any one of the first plurality of liquid turbines that has a failure while continuing to produce electricity from the first series;
flowing a portion of the high-pressure stream of LNG through a second plurality of liquid turbines coupled in a second series, wherein the second series is in parallel with the first series; and
generating electricity from the second plurality of liquid turbines by removing energy from the portion of the high-pressure stream of LNG while reducing pressure to form a low-pressure stream of LNG from the portion of the high-pressure stream of LNG.

10. The method of claim 9, further comprising:
transferring a portion of the high-pressure liquid stream of LNG from the first series to the second series.

11. A method for generating electricity from liquid turbines, comprising:
in a normal mode, flowing a high-pressure liquid stream through a first plurality of n liquid turbines coupled in a first series, wherein, after a first turbine in the first series, an inlet of each of a second through an n−1 liquid turbine of the first series is directly coupled to an outlet of a preceding liquid turbine;
generating electricity from the first series by removing energy from the high-pressure liquid stream to form a low-pressure liquid stream; and
bypassing any one of the first plurality of liquid turbines that has a failure while continuing to produce electricity with the remaining turbines of the first series.

12. The method of claim 11, further comprising:
maintaining a total electrical output from the first series as a constant value when a liquid turbine is bypassed.

13. The method of claim 11, further comprising:
operating the first plurality of liquid turbines in the first series that are not bypassed to maintain a pressure, temperature, and flow rate of the low-pressure liquid stream from the first series to be the same as a pressure, temperature, and flow rate of the low-pressure liquid stream when operating in the normal mode.

14. The method of claim 11, wherein the high-pressure liquid stream comprises a liquefied natural gas.

15. The method of claim 11, further comprising:
driving a variable frequency drive from an electric generator coupled to one of the liquid turbines, and if the variable frequency drive fails:
adjusting a speed of the liquid turbine coupled to the electric generator to synchronize a generator frequency with a grid frequency; and
directly coupling an output of the electric generator to an electrical grid.

16. The method of claim 11, further comprising:
removing a portion of the high-pressure liquid stream prior to the first series;
flowing the portion of the high-pressure liquid stream through a second plurality of n liquid turbines coupled in a second series in parallel with the first series, wherein, after a first turbine in the second series, an inlet of each of a second through an n−1 liquid turbine of the second series is directly coupled to an outlet of a preceding liquid turbine of the second series; and
generating electricity from the second series by removing energy from the portion of the high-pressure liquid stream to form another low-pressure liquid stream.

17. The method of claim 16, further comprising:

transferring a portion of the high-pressure liquid stream from the first series to the second series.

\* \* \* \* \*

UNITED STATES PATENT AND TRADEMARK OFFICE
CERTIFICATE OF CORRECTION

PATENT NO. : 11,644,234 B2  
APPLICATION NO. : 16/842246  
DATED : May 9, 2023  
INVENTOR(S) : Christopher G. Holt and Todd S. Griffith Page 1 of 1

It is certified that error appears in the above-identified patent and that said Letters Patent is hereby corrected as shown below:

On the Title Page

Item (73) Assignee: should read:
(73) Assignee: "ExxonMobil Technology and Engineering Company, Spring, TX (US)"

Signed and Sealed this
Thirteenth Day of June, 2023

Katherine Kelly Vidal
*Director of the United States Patent and Trademark Office*